United States Patent
Bai et al.

(10) Patent No.: US 10,078,878 B2
(45) Date of Patent: Sep. 18, 2018

(54) METHODS AND ARRANGEMENTS FOR IDENTIFYING OBJECTS

(71) Applicant: Digimarc Corporation, Beaverton, OR (US)

(72) Inventors: Yang Bai, Beaverton, OR (US); Eric D. Evans, Portland, OR (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/978,827

(22) Filed: Dec. 22, 2015

(65) Prior Publication Data

US 2016/0110839 A1 Apr. 21, 2016

Related U.S. Application Data

(63) Continuation of application No. 13/804,413, filed on Mar. 14, 2013, now Pat. No. 9,224,184.
(Continued)

(51) Int. Cl.
*G06T 1/00* (2006.01)
*G06K 9/32* (2006.01)
(Continued)

(52) U.S. Cl.
CPC ............ *G06T 1/005* (2013.01); *G06K 9/2054* (2013.01); *G06K 9/3233* (2013.01); *G06T 7/10* (2017.01);
(Continued)

(58) Field of Classification Search
CPC .... G06K 9/2054; G06K 9/3233; G06T 1/005; G06T 2201/0051; G06T 2201/0065; G06T 7/10
See application file for complete search history.

(56) References Cited

U.S. PATENT DOCUMENTS

| 3,651,478 A | 3/1972 | Shandlay |
| 4,656,463 A | 4/1987 | Anders |

(Continued)

FOREIGN PATENT DOCUMENTS

| EP | 0789270 | 8/1997 |
| JP | 2004252599 | 9/2004 |

(Continued)

OTHER PUBLICATIONS

Alattar, Smart Images Using Digimarc's Watermarking Technology, SPIE's 12.sup Symposium on Electronic Imaging, Jan. 25, 2000, vol. 3971, No. 25, 10 pages.
(Continued)

*Primary Examiner* — Siamak Harandi
(74) *Attorney, Agent, or Firm* — Digimarc Corporation

(57) ABSTRACT

In some arrangements, product packaging is digitally watermarked over most of its extent to facilitate high-throughput item identification at retail checkouts. Imagery of such packaging can be analyzed to detect digital watermarking. One claim recites a method comprising: receiving imagery representing two packaged item from a digital camera, each of the packaged items including digital watermarking encoded in packaging on the items; each of the packaged items including digital watermarking encoded in packaging on the items; using one or more programmed electronic processors, analyzing the imagery to detect the digital watermarking; accessing a spatial template associated with the digital watermarking when two or more instances of digital watermarking are detected in a single image frame; comparing spatial areas containing the two or more instances of digital watermarking within the imagery to the spatial template; carrying out an action based on the comparing. Of course, other claims, methods, apparatus and systems are described in this patent document.

20 Claims, 6 Drawing Sheets

Related U.S. Application Data

(60) Provisional application No. 61/716,591, filed on Oct. 21, 2012.

(51) Int. Cl.
  *G06K 9/20* (2006.01)
  *G06T 7/73* (2017.01)
  *G06T 7/10* (2017.01)
  *G06T 7/194* (2017.01)

(52) U.S. Cl.
  CPC .............. *G06T 7/194* (2017.01); *G06T 7/73* (2017.01); *G06T 2201/0051* (2013.01); *G06T 2201/0065* (2013.01)

(56) References Cited

U.S. PATENT DOCUMENTS

| | | | |
|---|---|---|---|
| 4,929,819 A | 5/1990 | Collins | |
| 5,546,475 A | 8/1996 | Bolle | |
| 5,568,570 A | 10/1996 | Rabbani | |
| 5,671,362 A | 9/1997 | Cowe | |
| 5,678,155 A | 10/1997 | Miyaza | |
| 5,742,704 A | 4/1998 | Suzuki et al. | |
| 5,809,139 A | 9/1998 | Girod et al. | |
| 5,828,467 A | 10/1998 | Suzuki | |
| 5,854,478 A | 12/1998 | Liu | |
| 5,859,920 A | 1/1999 | Daly et al. | |
| 5,862,260 A | 1/1999 | Rhoads | |
| 5,889,868 A | 3/1999 | Moskowitz et al. | |
| 5,915,027 A | 6/1999 | Cox et al. | |
| 5,930,369 A | 7/1999 | Cox et al. | |
| 5,949,885 A | 9/1999 | Leighton | |
| 5,960,081 A | 9/1999 | Vynne et al. | |
| 6,031,914 A | 2/2000 | Tewfik et al. | |
| 6,044,182 A | 3/2000 | Daly et al. | |
| 6,061,793 A | 5/2000 | Tewfik et al. | |
| 6,108,434 A | 8/2000 | Cox et al. | |
| 6,122,403 A | 9/2000 | Rhoads | |
| 6,137,491 A | 10/2000 | Szeliski | |
| 6,154,571 A | 11/2000 | Cox et al. | |
| 6,175,627 B1 | 1/2001 | Petrovic et al. | |
| 6,181,802 B1 | 1/2001 | Todd | |
| 6,185,312 B1 | 2/2001 | Nakamura et al. | |
| 6,208,735 B1 | 3/2001 | Cox et al. | |
| 6,209,094 B1 | 3/2001 | Levine et al. | |
| 6,222,932 B1 | 4/2001 | Rao et al. | |
| 6,311,214 B1 | 10/2001 | Rhoads | |
| 6,314,192 B1 | 11/2001 | Chen et al. | |
| 6,324,573 B1 | 11/2001 | Rhoads | |
| 6,330,673 B1 | 12/2001 | Levine | |
| 6,345,104 B1 | 2/2002 | Rhoads | |
| 6,360,000 B1 | 3/2002 | Collier | |
| 6,409,085 B1 | 6/2002 | Gu | |
| 6,435,407 B1 | 8/2002 | Fiordelisi | |
| 6,442,284 B1 * | 8/2002 | Gustafson | G06T 1/0078 382/100 |
| 6,449,377 B1 | 9/2002 | Rhoads | |
| 6,542,927 B2 | 4/2003 | Rhoads | |
| 6,550,674 B1 | 4/2003 | Neumark | |
| 6,550,685 B1 | 4/2003 | Kindberg | |
| 6,553,127 B1 | 4/2003 | Kurowski | |
| 6,590,996 B1 | 7/2003 | Reed et al. | |
| 6,614,914 B1 | 9/2003 | Rhoads et al. | |
| 6,626,359 B2 | 9/2003 | Haulk | |
| 6,736,316 B2 | 5/2004 | Neumark | |
| 6,826,119 B2 | 11/2004 | Fortune | |
| 6,882,738 B2 | 4/2005 | Davis | |
| 6,919,795 B2 | 7/2005 | Roseen | |
| 7,005,962 B2 | 2/2006 | Sundqvist | |
| 7,013,021 B2 | 3/2006 | Sharma et al. | |
| 7,100,824 B2 | 9/2006 | Ostrowski | |
| 7,118,027 B2 | 10/2006 | Sussman | |
| 7,213,751 B2 | 5/2007 | Baecklund | |
| 7,290,707 B2 | 11/2007 | Sawasaki | |
| 7,369,678 B2 | 5/2008 | Rhoads | |
| 7,392,948 B2 | 7/2008 | Smith | |
| 7,421,628 B2 | 9/2008 | Wright et al. | |
| 7,461,782 B2 | 12/2008 | Andersson | |
| 7,533,079 B2 | 5/2009 | Naito | |
| 7,537,170 B2 | 5/2009 | Reed | |
| 7,574,014 B2 | 8/2009 | Sharma et al. | |
| 7,574,363 B2 | 8/2009 | Bodin | |
| 7,693,757 B2 | 4/2010 | Zimmerman | |
| 7,806,335 B2 | 10/2010 | Knowles | |
| 7,909,248 B1 | 3/2011 | Goncalves | |
| 7,934,647 B1 | 5/2011 | Mims | |
| 7,949,568 B2 | 5/2011 | Fano | |
| 7,961,104 B2 | 6/2011 | Bodin | |
| 7,978,875 B2 | 7/2011 | Sharma et al. | |
| 7,986,806 B2 | 7/2011 | Rhoads | |
| 8,091,782 B2 | 1/2012 | Cato | |
| 8,117,071 B1 | 2/2012 | Fitch | |
| 8,150,658 B2 | 4/2012 | Beniyama | |
| 8,160,304 B2 | 4/2012 | Rhoads | |
| 8,355,525 B2 | 1/2013 | McKinley et al. | |
| 8,401,224 B2 | 3/2013 | Rhoads | |
| 8,473,374 B2 | 6/2013 | Allison | |
| 8,534,544 B1 | 9/2013 | Eker | |
| 8,577,136 B1 | 11/2013 | Ascher | |
| 8,699,828 B2 | 4/2014 | Ruzon | |
| 9,064,161 B1 | 6/2015 | Boman | |
| 9,129,277 B2 | 9/2015 | MacIntosh | |
| 9,183,580 B2 | 11/2015 | Rhoads | |
| 9,224,184 B2 | 12/2015 | Bai | |
| 2001/0017709 A1 | 8/2001 | Murakami et al. | |
| 2001/0028727 A1 | 10/2001 | Naito et al. | |
| 2001/0053237 A1 | 12/2001 | Hashimoto | |
| 2002/0066279 A1 | 6/2002 | Kiyomatsu | |
| 2002/0090110 A1 | 7/2002 | Braudaway et al. | |
| 2002/0124174 A1 | 9/2002 | Ehrmann-Patin et al. | |
| 2002/0136427 A1 | 9/2002 | Staring et al. | |
| 2002/0138374 A1 | 9/2002 | Jennings | |
| 2002/0146120 A1 | 10/2002 | Anglin | |
| 2003/0016841 A1 | 1/2003 | Reed et al. | |
| 2004/0012485 A1 | 1/2004 | Sundqvist | |
| 2005/0114684 A1 | 5/2005 | Ohno | |
| 2005/0171854 A1 | 8/2005 | Lyon | |
| 2005/0242186 A1 | 11/2005 | Ohbuchi | |
| 2006/0032915 A1 | 2/2006 | Schwartz | |
| 2006/0100967 A1 | 5/2006 | Grimaldi | |
| 2007/0086679 A1 | 4/2007 | Kudo | |
| 2007/0158417 A1 | 7/2007 | Brewington | |
| 2007/0179921 A1 | 8/2007 | Zitnick | |
| 2007/0272841 A1 | 11/2007 | Wiklof | |
| 2008/0296392 A1 | 12/2008 | Connell | |
| 2008/0300011 A1 | 12/2008 | Rhoads | |
| 2009/0017779 A1 | 1/2009 | Bonner | |
| 2009/0063306 A1 | 3/2009 | Fano | |
| 2009/0094140 A1 | 4/2009 | Kwan | |
| 2009/0152348 A1 | 6/2009 | Ostrowski | |
| 2009/0204512 A1 | 8/2009 | Connell | |
| 2009/0285483 A1 | 11/2009 | Guven | |
| 2010/0059589 A1 | 3/2010 | Goncalves | |
| 2010/0138281 A1 | 6/2010 | Zhang | |
| 2010/0158310 A1 * | 6/2010 | McQueen | G06K 9/00 382/100 |
| 2010/0217678 A1 | 8/2010 | Goncalves | |
| 2010/0237150 A1 | 9/2010 | Patel | |
| 2011/0015966 A1 | 1/2011 | Wasco | |
| 2011/0064298 A1 | 3/2011 | Schlosser | |
| 2011/0102155 A1 | 5/2011 | Choi | |
| 2011/0184972 A1 | 7/2011 | Ard | |
| 2011/0202481 A1 | 8/2011 | Lang | |
| 2011/0254860 A1 | 10/2011 | Zontrop | |
| 2011/0307786 A1 | 12/2011 | Shuster | |
| 2011/0320322 A1 | 12/2011 | Roslak | |
| 2012/0062596 A1 | 3/2012 | Bedi | |
| 2012/0127314 A1 * | 5/2012 | Clements | G08B 13/246 348/150 |
| 2012/0141660 A1 | 6/2012 | Fiedler | |
| 2012/0209749 A1 | 8/2012 | Hammad | |
| 2012/0233025 A1 | 9/2012 | Calman | |
| 2012/0235887 A1 | 9/2012 | Border | |

(56) References Cited

U.S. PATENT DOCUMENTS

| | | |
|---|---|---|
| 2013/0083064 A1 | 4/2013 | Geisner |
| 2013/0117153 A1 | 5/2013 | Shen |
| 2013/0176398 A1 | 7/2013 | Bonner |
| 2013/0223673 A1 | 8/2013 | Davis et al. |
| 2013/0286048 A1 | 10/2013 | Sternitzke |
| 2013/0293530 A1 | 11/2013 | Perez |
| 2013/0308818 A1 | 11/2013 | MacIntosh et al. |
| 2013/0314541 A1 | 11/2013 | Lord |
| 2014/0002643 A1 | 1/2014 | Aziz |
| 2014/0036630 A1 | 2/2014 | Herwig |
| 2015/0016712 A1 | 1/2015 | Rhoads et al. |
| 2015/0029339 A1 | 1/2015 | Kobres |
| 2015/0220810 A1 | 8/2015 | Mase |
| 2016/0105585 A1 | 4/2016 | Holub et al. |

FOREIGN PATENT DOCUMENTS

| | | |
|---|---|---|
| JP | 2005316755 | 11/2005 |
| WO | 2011001516 | 1/2011 |
| WO | WO200106755 | 1/2011 |
| WO | WO2011100048 | 8/2011 |
| WO | 2012135115 A2 | 10/2012 |
| WO | 2013033442 A1 | 3/2013 |
| WO | 2014063157 A2 | 4/2014 |

OTHER PUBLICATIONS

Avcibas, et al., "Steganalysis of Watermarking Techniques Using Image Quality Metrics", Proceedings of SPIE, Jan. 2001, vol. 4314, pp. 523-531.

Dautzenberg, "Watermarking Images," Department of Microelectronics and Electrical Engineering, Trinity College Dublin, 47 pages, Oct. 1994.

Hernandez et al., "Statistical Analysis of Watermarking Schemes for Copyright Protection of Images," Proceedings of the IEEE, vol. 87, No. 7, Jul. 1999.

Amended claims filed in European Application EP 12 82 8080 (European counterpart to WO2013033442), Apr. 28, 2014.

Cooduvalli, The Barcode Perspective, Asia Pacific Food Industry, Nov. 1, 2012.

GS1 Retail & Consumer Goods Newsletter, Aug. 2011, 8 pp.

International Search Report, dated Feb. 1, 2013, PCT application PCT/US2012/053201 (published as WO2013033442).

Lochtefeld, et al, Shelftorchlight: Augmenting a Shelf Using a Camera Projector Unit, Adjunct Proceedings of the Eighth International Conference on Pervasive Computing, 2010.

PCT International Preliminary Report on Patentability, PCT/US2012/53201 (published as WO2013033442), dated Mar. 4, 2014.

PCT International Search Report and Written Opinion, PCT/US13/65958 (published as WO2014063157), dated Apr. 16, 2014.

PCT International Search Report and Written Option of the International Searching Authority, PCT/US2012/53201 (published as WO2013033442), dated Feb. 1, 2013.

Supplementary Partial European Search Report, Application EP 12 82 8080, dated Jan. 22, 2016.

U.S. Appl. No. 60/125,349, filed Mar. 19, 1999, Alattar et al.

Bayesian Inference article, Wikipedia, Sep. 8, 2011.

Further excerpts from prosecution of European Application EP 12 82 8080 (European counterpart to WO2013033442), namely letter and amended claims dated Feb. 14, 2018.

\* cited by examiner

METHODS AND ARRANGEMENTS FOR IDENTIFYING OBJECTS

RELATED APPLICATION DATA

This application is a division of U.S. patent application Ser. No. 13/804,413, filed Mar. 14, 2013 (now U.S. Pat. No. 9,224,184) which claims the benefit of U.S. Patent Application No. 61/716,591, filed Oct. 21, 2013. This application is also related to U.S. Provisional Patent Application No. 61/749,767, filed Jan. 7, 2013, and PCT Application No. PCT/US12/53201, filed Aug. 30, 2012 (attached as Appendix A) and published on Mar. 7, 2013 as WO/2013/033442. Each of the above patent documents is hereby incorporated herein by reference in its entirety. The above PCT application is also included as part of this application as Appendix A. Appendix A is hereby incorporated herein by reference in its entirety.

TECHNICAL FIELD

The present technology concerns object identification and is suited, e.g., for identifying objects at supermarket checkouts and other retail locations.

BACKGROUND AND SUMMARY

The widespread use of barcodes has greatly simplified supermarket checkout. However, many problems persist, causing both inconvenience for shoppers and added costs for retailers.

One of the difficulties is finding a barcode on a package. While experienced supermarket clerks eventually learn barcode locations for popular products, even the best clerks sometimes have difficulty with less common products. For shoppers who use self-service checkout stations, any product can be confounding.

Another issue concerns re-orienting a package so that its barcode is in position for reading.

Digital watermarking can be placed on product packaging—preferably over the majority of the package—to improve checkout speed. Methods and systems for improving watermark detection from imagery obtained from retail checkout cameras are described herein.

The foregoing and a great number of other features and advantages of the present technology will be more readily apparent from the following detailed description, which proceeds with reference to the accompanying drawings.

DETAILED DESCRIPTION

Figure 1A:
FIGS. 1A-1F show a small can moving along a conveyor at a retail checkout station. The can enters the image frame in FIG. 1A and leaves the frame in FIG. 1F. The can is moving right to left in the images.

In accordance with one aspect of this disclosure, the present technology concerns a method for identifying items, e.g., by a retail checkout system. A first such method involves moving an item to be purchased along a path, such as by a conveyor. A first camera arrangement captures first 2D imagery (e.g., image or video) data depicting the item when the item is at a first position along the path. Suitable 2D imaging scanners are provided, e.g., by DataLogic ADC INC., located in Eugene, Oreg., USA.

The moving item preferably includes digital watermark printed or carried on the product packaging. The digital watermarking may span a substantial portion of the packaging extent. In regions where there is no printing (e.g., white space), a yellow or other unobtrusive watermark tint can optionally be applied. (Yellow watermarking is particularly discussed, e.g., in application Ser. No. 12/774,512, filed May 5, 2010, published as application no. US 2011-0274310 A1, and U.S. Pat. No. 6,345,104, each of which is hereby incorporated herein by reference in its entirety.)

Digital watermarking patterns can be applied to items in a tiled fashion, with a single square (or other shape) watermark pattern being replicated across and down the item being watermarked. The tiles are typically embedded with an upper left corner of a first tile coincident with the upper left corner of the artwork. Tiles are then placed across and down from this starting point. In other cases, tiles are placed to coincide with or within specific spatial areas on packaging.

Each watermark pattern may have an orientation. Common practice is to embed the watermark tiles so that they are oriented in the same manner as the artwork (i.e., with "up" in the artwork corresponding to "up" in the watermark pattern). Differing watermark orientation, however, can provide an indicator of different watermarked areas. For example, a first watermarked area may include a first orientation and a second watermarked area may include a second orientation. Identification of the different watermark orientations may help distinguish different spatial areas on the product packaging.

Examples of watermarking are discussed, e.g., in assignee's U.S. Patent Application No. 61/693,106; U.S. Pat. No. 8,199,969; and published application no. US 2010-0150434 A1. Each of these patent documents is hereby incorporated herein by reference in its entirety.

Watermark embedding can be optimized too, e.g., as discussed in assignee's U.S. provisional application No. 61/749,767.

Now back to some checkout scenarios. Recall from above that an item to be purchased moves along a path, such as a conveyor. A first camera arrangement captures image data depicting the item when the item is at a first position along the path.

The next sections discuss a prioritization watermark detector blocks within a captured image frame(s), e.g., across 30 frames or more per second. A watermark detector "block" may correspond to an image area (or specific image features) that the watermark detector will analyze to determine whether a watermark signal is hidden therein. For example, with reference to FIG. 5, six (6) areas of an image are blocked out for analysis by a watermark detector. A prioritization can determine which of these blocks will be analyzed first (block 1), second (block 2) and so one through block 6. If a watermark is found in block 1 or 2, the watermark detector can be configured to stop looking at the other blocks 3-6. This is a different scheme than some traditional watermark detectors have taken. For example, some detectors would start watermark detection analysis with a block in a corner of the image (shown with dashed block in FIG. 5) and proceed to analyze blocks vertically across and horizontally down the image block by block.

Sometimes, a digital watermark detector is fed an image of larger resolution (e.g., 1024×1280 pixels) than what is covered by a single watermark detector block (e.g., 256×256 pixels). If a watermark detector is looking at image areas one detector block at a time, then it may take the watermark detector multiple runs to perform a watermark detection analysis across a whole image frame. Given constraints on computational resources from the hardware (e.g., embedded device, ARM processor, etc.), it may be difficult to cover the whole area of every frame in a timely manner (e.g., as packaged items are buzzing by on the conveyor past the camera). Therefore, it may be beneficial to limit the number of blocks that are analyzed by a watermark detector per image frame. For example, a watermark detector may only select 3-21 blocks per image frame for detection analysis.

This may not be an issue for well-marked large packages because they fill a large portion of a field of view of a camera and, thus, the chances of a single block detector being placed on a watermarked area is high. On the other hand, small packages, like cans and small boxes (e.g., a tea box), may only show up in a small portion of the camera's field of view, as shown in FIGS. 1A-1F, making the chance of a single block detector being placed on a well watermarked area very low. FIGS. 1A-1F represent images from an in-counter barcode scanner camera with a moving soft drink can, e.g., of a small Red Bull can size, moving from right to left. FIG. 1A (the entering frame) and FIG. 1F (the leaving frame) are not considered good candidates for watermark detection, because the can occupies such a small space within the whole image frame.

During a normal checkout pace, and when the camera is running at a speed of, e.g., 30 Frames Per Second (FPS), a typical small package will show up in 2 to 4 frames with suitable watermark detection presence, as shown in FIGS. 1B-1E. Since a small package covers a small area of the camera's field of view, a strategy of reading a watermark hidden in the small package's packaging from many different detection blocks across the whole image frame may have diminishing returns in terms of complexity vs. successful reads. Possibly, a watermark detector may spend time looking for watermarks in the background or on the package's boundary but not on the package itself.

When dealing with a video stream, we have found that background subtraction from the moving average of previous frames is a computationally efficient and effective method to extract the fast moving foreground objects. This method can separate static or slow moving objects (classified as background) from fast moving objects (classified as foreground), and place more single-block watermark detector blocks on more meaningful areas (e.g., in terms watermarked areas) of foreground objects.

Foreground detection can be configured to work as follows:

1. Background($k$+1)=alpha*Frame($k$+1)+(1−alpha)
   *Background($k$),

2. Foreground($k$+1)=Frame($k$+1)−Background($k$+1),
   if Frame($k$+1)−Background($k$+1)>threshold, where indices k or k+1 represent the incoming frame's temporal axis, alpha is the learning rate which controls how to update background from the incoming frame, and the threshold can be set to help suppress noise from illumination variations.

This process is computationally efficient because it may use pixel-wise subtraction, addition and comparison. Also memory usage is low since it does not save all previous frames but only a weighted average of some of the more recent frames. By efficient post-processing and clustering the results of each pixel, or groups of pixels, approximate information about location/shape of the foreground object can be obtained. Processing can be done in real time, or near real time.

The location and/or shape of the object can be utilized to constrain the area where watermark detector blocks should be placed. Significant savings in the computational complexity can be achieved without losing detection robustness.

Once the foreground region has been detected, we can assign detector block locations in the imagery to enhance detection. For example, the block patterns shown in FIGS. 2A and 2B can be placed over the foreground area (e.g., over the can in FIG. 1C). There are 6 detector blocks in FIG. 2A and 11 blocks in FIG. 2B. The two (2) darker blocks in FIG. 2B can be at a higher watermark resolution than the nine (9) lighter colored blocks. In some detection scenarios the patterns of these figures can be combined to identify 17 detection blocks per image frame. The imagery within each of these 17 blocks can be analyzed by a watermark detector to determine whether one or more watermarks are hidden therein. As discussed above, the detector may optionally be configured to cease detection of remaining blocks once a watermark is identified.

Figure 2A:
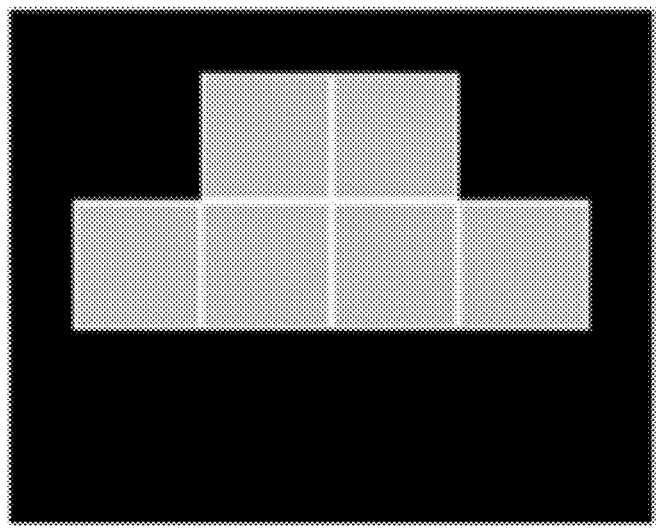
FIGS. 2A and 2B illustrate possible watermark detection block patterns.
Figure 2B:
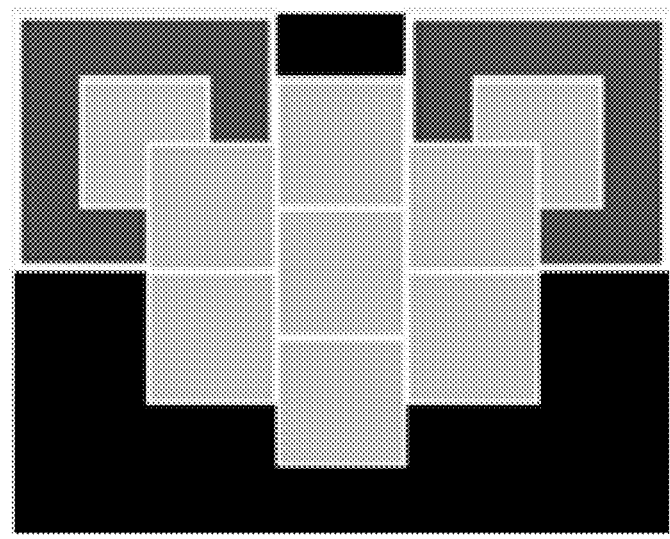

A first option uses a determined foreground region to trim down the FIGS. 2A & 2B patterns. For example, in the case of a combined 17 detection blocks (e.g., combining FIGS. 2A & 2B's patterns to yield 17 watermark detection blocks), a particular detection block will only be used by a watermark detector if the block falls inside (or, in some cases, overlapping with) a determined foreground region. In the case of overlapping, a detector can set a predetermined threshold, e.g., 75% or more of overlap with the foreground region.

A second option is now discussed.

As a first action in the second option, the foreground region in captured imagery can be expanded to a square region or other shaped window, enclosing all (or most of) the foreground pixels. Then the square foreground region can be divided into zones, e.g., equally spaced zones. The foreground pixels (e.g., as determined by incoming pixels minus background pixels) inside each zone can be summed together. This summation is a representation of the illumination of the foreground.

As a second action in the second option, two approaches can be used to prioritize the placement of detecting blocks (e.g., areas in which the watermark detector will look for watermark signal) inside the square foreground region, because the number of single block analysis areas may not be enough to cover the whole region.

The first approach is based on illumination (or brightness). The foreground zones are ranked according to their illumination, with those of a higher rank indicating a relatively better illumination compared to those of lower rank. We would prefer not to place the single block detectors on poor illuminated zones, so the watermark detector is configured to avoid those poor illuminated zones. Also, the watermark detector may be configured to discard or ignore zones with high illumination values because they may indicate over-saturated pixels from glare (e.g., caused by specular reflection from the packaging by a scanner illumination).

The second approach is based on a geometric position of each zone. In some cases the zones or areas near the top of the frame and near the bottom of the frame detect poorly, due to over-saturated pixels on the top and poor illuminated pixels on the bottom. So a weighting can be assigned to each zone based on its geometric locations within an image frame. For example, central zones may be weighted more significantly than zones close to the frame boundary. Or zones close to frame boundary may only be considered if no watermark is initially found in central frame zones.

To combine the two approaches, we can add a normalized illumination value of each zone with the weight of each zone from its geometric position, and then do an ascending ranking of detection blocks. Those zones with a higher value will have higher detection priority in acquiring a single-block detector.

The above second option is illustrated in FIG. 3A-3J. The minimum separation between selected detection blocks is set to a predetermined pixel value, e.g., 64 pixels between each block, to avoid choosing blocks with too much overlap (i.e. blocks that are from similar image areas). These FIG. 3 images show 10 composed frames of a coffee can imaged from an in-counter barcode scanner camera. Each image includes the incoming frame (upper left quadrant), detected square foreground region (lower left quadrant), and up to 7 detection blocks overlaid on top of the incoming frame (upper right quadrant).

We have performed some experiments to verify our process. The test datasets we used are ad-hoc captures from non-professional checkers simulating a supermarket checkout process. We have two datasets, one labeled Scan-1 and the other Scan-2. The Scan-1 dataset contains mostly small packages (e.g., small cans) and has 1025 frames of about 30 seconds recording from an in-counter barcode scanner camera, and the Scan-2 dataset contains both small and large packages and has 596 frames from the same camera. The Scan-2 dataset contains more frames with packages inside so it has more frames detected as containing watermarking.

The results of using the first option, which uses a determined foreground region to trim down the B17 pattern (including 17 detection blocks), are shown in Table 1. There are 168 frames and 53 frames detected as containing watermark from Scan-2 and Scan-1 datasets, respectively, using the fixed static B17 pattern. By switching to the flexible foreground trimmed B17 (e.g., focuses on blocks that fall within the foreground area), to get the same detection rate, on average, only 10 frames are required for Scan-2, and only 7 frames are required for Scan-1. Since Scan-1 contains more small packages, and the benefits of using foreground detection is more obvious on small packages, the savings in terms of number of blocks per frame is more significant for Scan-1.

TABLE 1

Compares flexible pattern from foreground with fixed static pattern in placing single block detectors.

| | | |
|---|---|---|
| SCAN-2 | 168 frames detected with flexible foreground placement 2680/275 = 9.75 block/frame | 168 frames detected w. fixed detection pattern 17 block/frame |
| SCAN-1 | 53 frames detected with flexible foreground placement 978/162 = 6.04 block/frame | 53 frames detected with fixed detection pattern 17 block/frame |

Figure 4A:
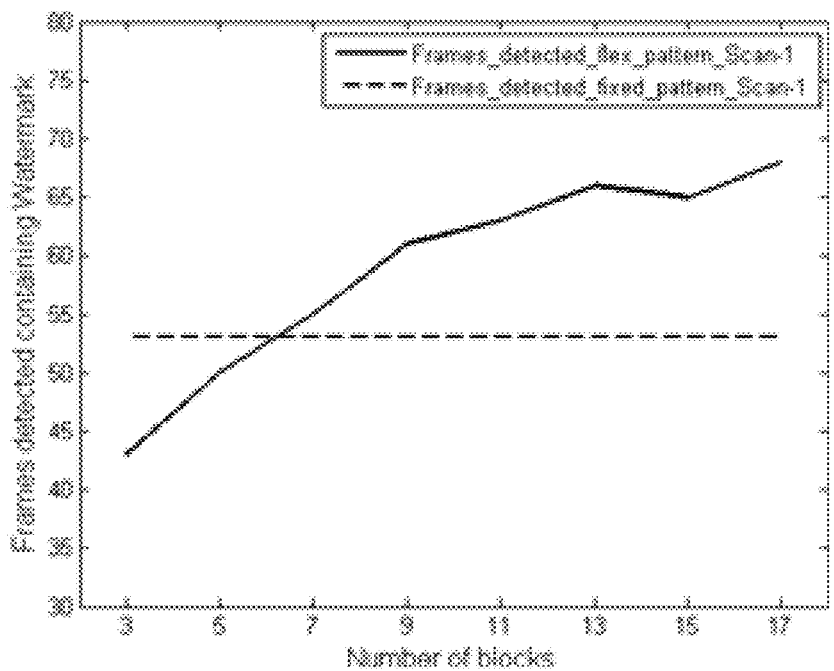
FIGS. 4A and 4B show detection results from test scans.
Figure 4B:
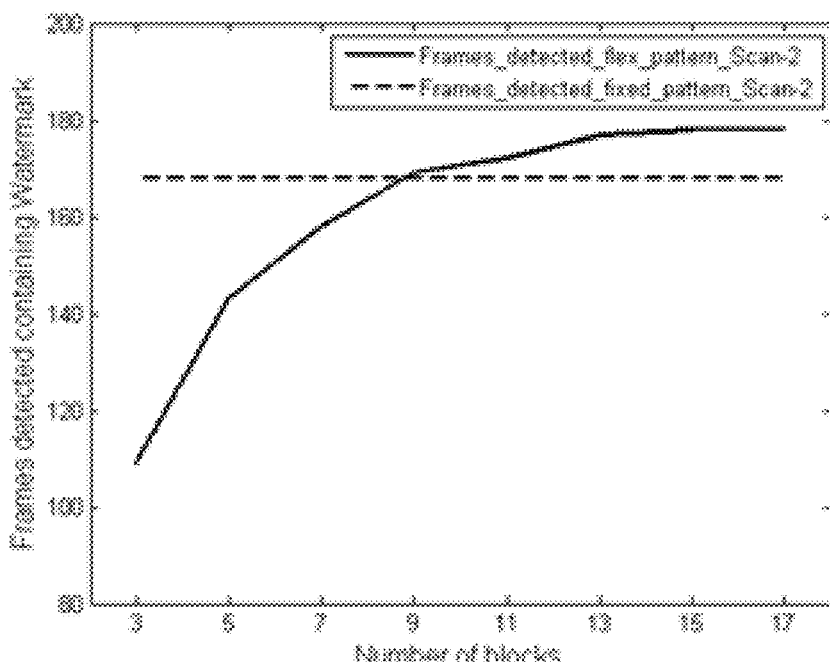

The results of using the second option are shown in FIGS. 4A and 4B. The straight-dashed lines mark the number of detected frames from Scan-2 and Scan-1 datasets using the static B17 pattern, 168 and 53, respectively. The curves indicate the number of detected frames when choosing different number of blocks for placement inside a foreground region. In general, when you have large set of detector blocks, say, e.g., 17, then the flexible block pattern give better detection results. And if you limit the number of detector blocks, say, down to 9, the flexible block pattern still gives a good detection rate with much reduced computational cost.

In other cases, a "smart watermark detector," one that can train itself based on user or cashier habits or preferences, is preferred. For example, through a series of training checkout runs, it can be determined that cashier 1 holds packaged items at a certain angle, or at predetermined distances from the camera, or at a certain swipe speed, or places items on a conveyor at certain orientations. Other training information may include, e.g., proximity to the scanner, speed of scanning, production rotation habits, professional vs. amateur checker speed or habits or characteristics, etc. Or the detector may determine that they are only getting watermark reads from certain block areas when a certain checker checks out. All this information (or subsets of this information) can be used to adjust the watermark detector, e.g., by determine which blocks to prioritize in a detection process. For example, it might be found that cashier 1 always swipes items in front of the camera so that the packages are in the top or bottom of the field of view. Whereas, above, these block areas would typically be prioritized low. But if the detector knows that cashier 1 is checking out then these areas can be more highly prioritized. For example, these blocks are analyzed for watermarking prior to blocks located in other areas of the field of view. While this passage has focused on digital watermarking, similar user-specific information can be used to adjust, e.g., an image recognition or fingerprinting process.

A user's self-checkout habits—including how and at what speed they present objects to the check-out camera—can be monitored and then when they are determined they can be used to help configure a watermark detector, e.g., by prioritize block selection for watermark detection. A store loyalty card, customer ID or other identifier can be associated with a database or record storing the proper detector prioritization. That prioritization can then be used to inform the watermark detector on how to better process imagery for that person checking out. For example, a customer shows their loyalty card or enters (e.g., types on a touch screen or speaks to a voice recognition unit) prior to checking out. The customer's checkout profile is identified and applied to the watermark detector. For example, it might be determined that a particular customer holds packages at a certain pose. Captured imagery can be adjusted prior to watermark detection to adjust for the pose using pose estimation and homography, e.g., as discussed in assignee's U.S. patent application Ser. No. 13/789,126, filed Mar. 7, 2013, issued as U.S. Pat. No. 9,684,941, which is hereby incorporated herein by reference in its entirety.

Some checkout stations will continue to monitor barcodes even if supplemental symbologies like watermarking are present during checkout. In these cases please consider the flowing flow:

1. Imagery is presented to a watermark detector.
2. The watermark detector analyzes the imagery and detects a watermark. The watermark may include a payload or index or other information.
3. A process is invoked that utilizes that watermark information, index or payload (or portions thereof) to create or obtain an image overlay for captured imagery. The image overlay preferably includes a barcode or other symbology that includes the watermark information, or information obtained from utilizing the watermark information. That way, if the same imagery that is analyzed for a digital watermark is then feed to a barcode reader the graphic overlay barcode will be easily recognizable even if the depicted product packaging did not display a barcode.

One challenge may occur if two or more of the same packaged items are within a single image frame. For example, 2 cans of diet Mountain Dew might be pictured in the same frame. The watermark detector finds a read, but in different, non-contiguous image areas. In such cases a watermark payload may be used to look up a spatial template. The spatial template is sized roughly to represent a particular item (e.g., diet soda). The spatial template is placed around a block area where watermarks were detected. If watermarks (or watermark components like orientation components) are located outside of the spatial template (or outside of a predetermined area or tolerance) then there is a likelihood that the image frame includes two or more watermarked objects.

The cashier can be warned to examine this area more carefully, or the system may make a determination to independently ring up both items.

In another implementation, the checkout camera includes or cooperates with special illumination. The illumination projects watermark orientation information on the packaging. The projected illumination is captured along with the packaged items. The projected orientation information is deciphered by the watermark detector to help determine positioning information including relative depth, orientation, etc. This information can be used in watermark detection, or foreground/background decisions.

In still another implementation, watermarks are used to identify certain areas on packaging. For example, a watermark signal (e.g., an orientation component) might be used to outline the nutrition facts on a package. The watermarked area is then used to create a spatial position on a reading device (in this case, e.g., a smartphone like an iPhone or Android device). An augmented reality display is overlaid on the watermarked area, e.g., as discussed in assignee's U.S. patent application Ser. No. 13/789,126 (issued as U.S. Pat. No. 9,684,941).

CONCLUDING REMARKS

This specification details a variety of embodiments. It should be understood that the methods, elements and concepts detailed in connection with one embodiment can be combined with the methods, elements and concepts detailed in connection with other embodiments and with those discussed in Appendix A. While some such arrangements have been particularly described, many have not—due to the large number of permutations and combinations. However, implementation of all such combinations is straightforward to the artisan from the provided teachings.

Although features and arrangements are described, in some cases, individually, the inventors intend that they will also be used together. Conversely, while certain methods and systems are detailed as including multiple features, the inventors conceive that—in other embodiments—the individual features thereof are usable independently.

The present specification should be read in the context of the cited references (with which the reader is presumed to be familiar). Those references disclose technologies and teachings that applicant intends be incorporated into certain embodiments of the present technology, and into which the technologies and teachings detailed herein be incorporated.

For example, with the documents cited in Appendix A, certain of the cited references teach that a single image sensor can be used, in conjunction with mirrors and other optics, to capture imagery of an object from two or more different views (as opposed to using two or more different cameras). Some such arrangements use wavelength-selective optics (e.g., dichroic mirrors) so that three different images can be projected onto common pixel elements of a single sensor, allowing separate processing of the three different images in different color channels. Other such arrangements use mirrors to project images from different viewpoints onto different rectangular sub-regions of a common sensor. Still further, other of the prior art teaches that a color (RGB) image sensor can be used to capture imagery of an object, yet object identification can proceed using just pixels of a single color (e.g., whichever color shows the highest variance in its histogram). The artisan will recognize that these and all the other arrangements taught in the cited art can utilize the methods and features detailed herein, and vice versa.

To provide a comprehensive disclosure, while complying with the statutory requirement of conciseness, applicants incorporate-by-reference each of the documents referenced herein. (Such materials are incorporated in their entireties, even if cited above in connection with specific of their teachings.)

Although not particularly illustrated, it will be recognized that the methods described above can be implemented using general purpose (or special purpose) computers, e.g., comprising one or more processors, multi-core processors, semiconductor memory, hard disks, networking connections, and input-output devices, as are conventional in the art. Software instructions for implementing the above-detailed methods can be stored on tangible media associated with such systems, e.g., disks and semiconductor memories.

While the focus in the above sections has been on digital watermark recognition, many of the above techniques will also enhance other object-identifying techniques such as a barcode, optical character recognition, image recognition, fingerprinting. For example, the foreground identification techniques above can be used to locate frame areas to derive fingerprints.

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

Appendix A (PCT/US12/53201, filed August 30, 2012)

METHODS AND ARRANGEMENTS FOR IDENTIFYING OBJECTS

Related Application Data

In the United States, this application is a continuation-in-part of application 13/231,893, filed September 13, 2011, which claims priority to copending provisional applications 61/529,214, filed August 30, 2011, 61/531,525, filed September 6, 2011, and 61/533,079, filed September 9, 2011. This application also claims priority benefit to provisional applications 61/537,523, filed September 21, 2011, and 61/693,225, filed August 24, 2012.

Technical Field

The present technology concerns object identification and is suited, e.g., for identifying objects at supermarket checkouts.

Background and Summary

The widespread use of barcodes has greatly simplified supermarket checkout. However, many problems persist, causing both inconvenience for shoppers, and added costs for retailers.

One of the difficulties is finding a barcode on a package. While experienced supermarket clerks eventually learn barcode locations for popular products, even the best clerks sometimes have difficulty with less common products. For shoppers who use self-service checkout stations, any product can be confounding.

Another issue concerns re-orienting a package so that its barcode is in position for reading. Many items are straightforward. However, particularly with large items (e.g., a carton of diapers, or a heavy bag of dog food), it can be a physical challenge to manipulate the product so that the barcode is exposed to the reader. Often in self-service checkout stations, the physical constraints of the checkout station compound the difficulty, as these stations commonly don't have the handheld scanning capability with which conventional checkouts are equipped – forcing the shopper to manipulate the product so that barcode faces a glass scanning platen on the counter. (When properly positioned, the shopper may be unable to view either the platen or the barcode – exacerbating the difficulty.) Moreover, it is not enough for the barcode to be visible to the scanner; it must also be presented so as to roughly face the scanner (i.e., its surface normal must generally be within about 40-50 degrees of facing the scanning device in order to be read).

Sometimes a product is flipped and turned in search of a barcode, only to find there is none. Bottles of wine, for example, commonly lack barcodes.

Yet another issue is occasional difficulty in getting the scanning equipment to successfully read the barcode, after the barcode has been found and correctly positioned. This is a particular problem with malleable items (e.g., a package of frozen peas), in which the barcoded surface is crinkled or otherwise physically distorted.

To redress such issues, some have proposed identifying products with passive tags that can be sensed by radio (e.g., RFID and NFC chips). However, the costs of these tags are an obstacle in the low-margin grocery business. And it can be difficult to distinguish the responses from several different items on a checkout counter. Moreover, certain materials in the check-out queue may be radio-opaque – preventing some identifiers from being read. Privacy issues raise yet further concerns.

Other checkout technologies have also been tried. For example, in patent publication 20040081799, Kodak describes how a marking can be applied to supermarket packaging by adding a polymer layer that defines scannable information in the form of matte and glossy areas. The matte/glossy areas can form indicia such as barcodes, or digital watermarks. However, this technology requires applying a polymer layer to the packaging – a further expense, and an additional processing step that packagers are not presently equipped to provide.

Other identification technologies have been proposed for use in conjunction with barcode-based product identification. For example, patent application 20040199427 proposes capturing 2D imagery of products, and checking their color histograms against histograms associated with products identified by sensed barcode data, to ensure correct product identification. The same publication similarly proposes weighing articles on the conveyor – again checking for consistency with the barcode-indicated product. Publications 20040223663 and 20090060259 teach related arrangements, in which imagery of products is used to check for possibly switched barcodes.

Applicant's patent 7,044,395 teaches that a watermark can replace a barcode, such as a UPC symbol or other standard product code, in a retail point of sale application. A reader unit at a checkout counter extracts a product identifier from the watermark, and uses it to look up the product and its price.

Patent 4,654,872 describes a system employing two video cameras, which captures images of a 3D article, and uses the imagery to recognize the article. Patent 7,398,927 teaches another two-camera system, this one to read product codes from articles despite specular reflections. Patent 7,909,248 details a self-service checkout terminal in which captured imagery is compared against a database of reference imagery to try to identify a matching product.

In accordance with various embodiments of the present technology, certain drawbacks of the prior art are overcome, and new capabilities are provided.

For example, in one aspect, the present technology involves marking product packaging with a digital watermark that encodes related information (e.g., Universal Product Codes, such as UPC-A or UPC-E; Electronic Product Codes – EPC, European Article Number Codes – EAN, a URI or web address, etc.). The marking spans a substantial part of the packaging surface area, so that it can be sensed from one or more fixed cameras at a checkout station without repositioning of the item. The watermark indicia is applied to the packaging along with other printing – integrated in the other packaging artwork.

In one such embodiment, a variety of recognition technologies are used at a checkout station – looking for different indicia of product identification (watermark, barcode, color histogram, weight, temperature, etc.). The system applies a set of rules to the collected evidence, and outputs a product identification based on the available information.

In another aspect, crinkles and other deformations in malleable product packaging are optically sensed, and are used in decoding an identifier from the distorted surface (e.g., the crinkled surface can be virtually flattened prior to decoding the identifier). In one particular such arrangement, the crinkled configuration is sensed by structure-from-motion techniques. In another, the product configuration is sensed by a structured light scanner (e.g., of the sort popularized by the Microsoft Kinect sensor).

In yet another aspect, a checkout station comprises a conveyor belt that includes markings that are optically sensed, and which are used to increase check-out speed and accuracy.

In still another aspect, imagery captured from an item being conveyor-transported at a checkout station is processed to compensate for motion blur, prior to applying a product recognition technology.

In yet another aspect, a plenoptic camera system senses information at a checkout station. The collected light field data is then processed to yield multiple different planes of focused imagery, to which product recognition technologies are applied. In some embodiments, these planes include a variety of non-parallel planes.

In still another aspect, 2D imagery acquired at a checkout station is applied to a GPU, which computes multiple perspective-transformed versions of the imagery. These different versions of the imagery are then analyzed for product recognition purposes. The GPU can process input imagery of several different focal lengths, e.g., captured by plural fixed-focus cameras, or by a camera that cyclically changes its focal plane, or by plenoptic sensing.

In yet another aspect, a pile of items presented for checkout are volumetrically modeled and segmented to identify component items.

In still another aspect, the location of an item that is too obscured to be identified within a pile, is determined, so that a clerk or a mechanical element can expose it for identification.

In yet a further aspect, a confidence score is computed that indicates the certainty of an identification hypothesis about an item. This hypothesis is tested against collected evidence, until the confidence score exceeds a threshold (or until the process concludes with an ambiguous determination).

In still another aspect, data acquired away from the checkout station (e.g., in a store aisle) is used in identifying items at checkout. This data can include, e.g., sensor data evidencing removal of a product from a shelf, location data indicating that the shopper paused near certain merchandise, etc. Such data may be accorded a weight that varies with a time elapsed between its sensing and item checkout.

In yet another aspect, a clerk's or shopper's interaction with an item is sensed to aid in identification of the item. For example, a clerk's gaze may be tracked to identify the location of a salient feature on the item, or a shopper's particular hand pose in grasping the item when putting it into a cart or onto a checkout conveyor may provide some evidence about the item's identity.

In still another aspect, a system provides guidance to a clerk or shopper concerning a manner of packing items into bags, e.g., based on the shapes, weights and temperatures of the purchased items.

In yet a further aspect, different items at a checkout station are illuminated with light of different colors, e.g., to indicate items that have been successfully identified (or not), to indicate which items should be placed in which bags, etc.

The foregoing and a great number of other features and advantages of the present technology will be more readily apparent from the following detailed description, which proceeds with reference to the accompanying drawings.

Brief Description of the Drawings

[Figs. 1-36 from PCT/US12/53201are hereby incorporated herein by reference from its published PCT Application No. WO/2013/033442. Reference to figures in this Appendix A correspond to those in the WO/2013/033442 application.]

Detailed Description

In accordance with one aspect, the present technology concerns a method for identifying items, e.g., by a supermarket checkout system. A first such method involves moving an item to be purchased along a path, such as by a conveyor. A first camera arrangement captures first 2D image data depicting the item when the item is at a first position along the path. Second 2D image data is captured when the item is at a second position along the path. A programmed computer, or other device, processes the captured image data – in conjunction with geometrical information about the path and the camera – to discern 3D spatial orientation information for a first patch on the item. By reference to this 3D spatial orientation information, the system determines object-identifying information from the camera's depiction of at least the first patch.

In a variant embodiment, the second 2D image data is captured by a second camera arrangement – either when the item it at its first position or its second position along the path.

The object-identifying information can be a machine-readable identifier, such as a barcode or a steganographic digital watermark, either of which can convey a plural-bit payload. This information can additionally or alternatively comprise text – recognized by an optical character recognition engine. Still further, the product can be identified by other markings, such as by image fingerprint information that is matched to reference fingerprint information in a product database.

In some embodiments, the system processes the first and second 2D image data – in conjunction with geometrical information about the path and the camera – to discern second 3D spatial orientation information – this time for a second patch on the item. This second 3D spatial orientation information is typically different than the first 3D spatial orientation information. That is, the second patch is not co-planar with the first patch (e.g., the patches may depict different sides of a carton, or the surface may be deformed or wrinkled). By reference to the discerned first and second 3D spatial orientation information, the system determines identification information for the item. In such arrangement, the identification information is typically based on at least a portion of the first patch and a portion of the second patch. In the case of a barcode, for example, it may span both patches.

In like fashion, the system can determine the 3D pose of an arbitrary number of non-parallel patches on the item, and identify the item based on information from plural such patches.

In some embodiments, the item is moved by a conveyor belt that is provided with markings (e.g., printed or otherwise applied to its surface). These markings can be steganographic or overt. The imagery captured by the camera arrangement(s) includes at least some of these markings. The system analyzes the markings in the captured imagery in connection with the product identification. For example, the system can employ such markings to sense the speed of the conveyor, or to sense the distance to a point on an item resting on the conveyor, or to sense a size of the item on the conveyor, or to calibrate color information in the image(s) (e.g., white balance), or to provide an "image prior" useful in determining a deblurring kernel for motion blur compensation or for other image enhancement processing, etc.

One illustrative marking is a pattern of white "+" indicia, of known dimensions, arrayed uniformly across a black conveyor. Another is a 2D barcode symbology (e.g., a QR code), again printed white-on-black. The same symbology may be regularly repeated, or different symbologies can be used at different locations on belt (e.g., at different distances from a reading window; the barcode can encode information related to its position on the belt).

In some instances, the markings are visible and promotional (e.g., text markings), yet can still serve one or more of the purposes detailed herein.

The foregoing will be made clearer by a particular example:

Fig. 1A shows a supermarket checkout station 10 in which an item 12 to be purchased is transported by a conveyor belt 14. A first camera 16 captures image data depicting the item.

Item 12 may be irregular in shape, such as a package of frozen peas. Its configuration can be regarded as a collection of adjoining surface patches (e.g., patch 18), each oriented at a different angle. (The orientation of a patch may be characterized by two angles. One is the angle (theta) relative to the lengthwise axis of the conveyor, i.e., the angle at which the plane of the patch intersects that lengthwise axis. The second is the angle (phi, not depicted in Fig. 1A) relative to the crosswise axis of the conveyor, i.e., the angle at which the plane of the patch intersects that cross-wise axis. Other geometries can of course be substituted.)

Camera 16 generates imagery in which each patch is depicted with a particular size, shape and position within the image frame, based on (1) the two orientation angles for the patch, (2) the 2D position of the item on the conveyor, i.e., both along its length and width; (3) the height of the patch relative to the conveyor; (4) the lens function of the camera; and (5) the patch geometry itself.

In Fig. 1A, the patch 18 subtends an angle alpha ($\alpha$). In the depicted representation, this patch spans a distance "x" across the camera sensor's field of view "y" – corresponding to a particular range of sensing elements in the camera's sensor (typically CCD or CMOS).

Figure 1B:
Figure 1C:
Figure 1D:
Figure 1E:
Figure 1F:

A moment later, the package of peas 12 has moved a distance "d" along the conveyor, as shown in Fig. 1B. The angle alpha has changed, as has the span "x" of the patch across the sensor's field of view.

By reference to known parameters, e.g., the conveyed distance d, the change in pixels spanned by the patch (which correlates with the angle alpha), and the camera lens function, the system determines the angle theta in Fig. 1B (and also in Fig. 1A).

Once the angle theta has been determined, an exemplary system performs a perspective-transform (e.g., an affine-transform) on the depiction of the patch 18 in the Fig. 1B captured imagery, to yield transformed imagery that compensates for the angle theta. That is, a transformed patch of imagery is produced in which the patch appears as if it lies in plane 20, with an angle $\theta$' that is perpendicular to a ray 22 from the patch to the camera lens.

In like fashion, the angle phi (not shown in Fig. 1B, due to the side view) can be determined. Again, the depiction of the patch 18 can be correspondingly transformed to compensate for this angle phi, to yield a virtually reoriented patch that lies in a plane perpendicular to ray 22.

Techniques for deriving the 3D geometry of patch 18 from the captured imagery are familiar to those skilled in the art, and include "structure from motion" and "simultaneous location and mapping" (SLAM) methods. These techniques commonly rely on identification of distinctive features (salient points) in one image, and identifying corresponding features in another image. The difference in relative positions of the features between the two images indicates the geometry of the surface on which they lie. (One class of distinctive feature suitable for such analysis is the class of "corner points." Corner points include features such as the ends of lines on contrasting backgrounds. It will be recognized that barcodes have multiple such features – two for each line in the barcode. Another such distinctive feature is the robust local identifier, e.g., as used in SIFT and SURF techniques.)

All of the other patches comprising item 12, which are viewable by the camera in both Fig. 1A and Fig 1B, are similarly transformed. Such transformations desirably also transform the scale of the depicted patches so that each appears – after transformation – to lie the same distance from the camera sensor, perpendicular to the camera axis.

By such processing, the system renders a virtually flattened package of peas (or other 3D shape) – presented as if its component face patches are coplanar and facing the camera.

Figs. 2A and 2B schematically illustrate this virtual flattening. Item 12 includes three component patches 18, 20 and 22, lying in different planes. These patches are imaged by camera 16, from two (or more) different perspectives (e.g., as the item is moved along the conveyor). Based on such information, the system determines the location of the three patches in 3D space. It then re-projects the three patches to lie in a common plane 24, as if facing the camera, i.e., parallel to the camera's image sensor. (Dashed lines separate the three component re-projected surfaces in Fig. 2B. Of course, this illustration only shows virtual flattening of the surface along one dimension. A preferred implementation also virtually flattens the surface along the crosswise dimension of the conveyor, i.e., into the page.)

To this set of re-mapped image data, an extraction process is applied to generate identification data corresponding to the item. The preferred embodiment applies a digital watermark decoding algorithm, but other identification technologies (e.g., barcode decoding, image fingerprinting, OCR, etc.) alternatively can be used.

If a watermark or barcode is present on item 12, it can likely be decoded, regardless of the irregular configuration or presentation of the item on the conveyor. Such marking may be found within a single patch, or it may span two or more patches. In a preferred embodiment, the digital watermarking spans a substantial portion of the packaging extent. In regions where there is no printing (e.g., white space), a yellow or other unobtrusive watermark tint can be applied. (Yellow watermarking is particularly discussed, e.g., in application 12/774,512, filed May 5, 2010, and patent 6,345,104.)

In some embodiments, it is not necessary to virtually reorient the patch(es) to compensate for both angles theta and phi. Because many decoders are tolerant of some angular skew, a partial angular compensation of the patch(es), in theta and/or phi, is often sufficient for reliable decoding. For example, the patches may be remapped so they all have the same theta angle, but various phi angles. Or a partial correction in either or both of those dimensions can be applied. (A partial correction may be effected through use of affine transforms, whereas a perfect correction may require non-affine, perspective transforms.)

Image fingerprinting techniques (e.g., SIFT, SURF and ORB) that are used for object identification are also somewhat robust to non-plan views of the object. Yet some virtual remapping of the imagery to re-project it to a more flattened state is helpful to assure best results.

The distance along the conveyor can be determined by reference to the difference in times at which the images of Figs. 1A and 1B are captured, if the conveyor velocity is uniform and known. As noted, the belt may be provided with markings by which its movement alternatively can be determined. (The markings can be promotional in nature, e.g., Tony the Tiger, sponsored by Kellogs.) In still other embodiments, a conveyor is not used. Instead, the item is moved past the camera by hand. In such case, the distance and other path parameters can be estimated by feature tracking, from features in the captured imagery. Alternatively, a structured light scanning arrangement can be employed.

In some implementations, the speed of the conveyor varies in accordance with signals from a control unit, e.g., operated by a cashier's foot. The speed can be sensed by a electro-mechanical arrangement (e.g., a roller wheel and an optical chopper) or from analysis of the captured imagery. Such knowledge of the conveyor speed can be used in extracting identification information relating to objects on the conveyor (e.g., re mitigating motion blur before extracting identification information, etc.).

Figure 3A:
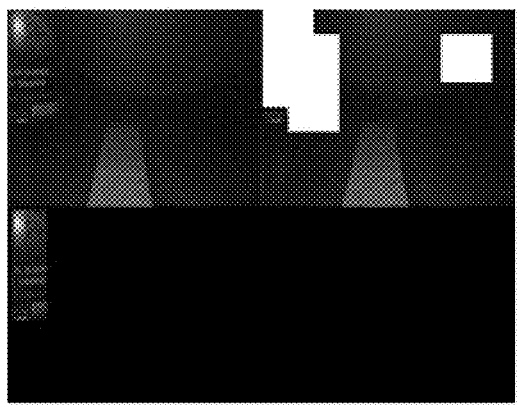
FIGS. 3A-3J show composite images of a coffee can moving along a conveyor at a retail checkout station. Detection blocks are shown in the upper right quadrant of each image composite.
Figure 3B:
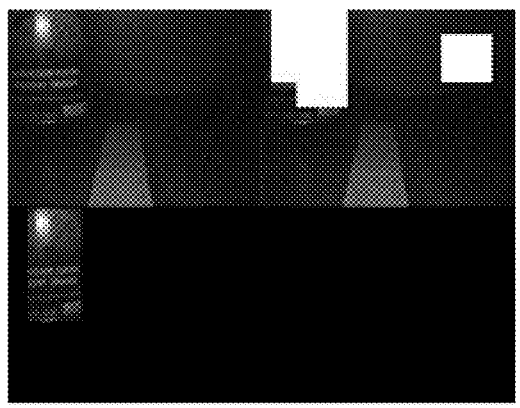

Figs. 3A and 3B show a further arrangement in which two cameras are used. Such arrangement allows image capture from patches of the item that may not be visible to a single camera. In such embodiment, the cameras may be at different elevations relative to the conveyor (including below, e.g., looking up through a glass platen). They may also be oriented at different angles (theta and/or phi) relative to the conveyor. They can also be spaced at different positions along the length of the conveyor, so that the time intervals that the item is viewed by the two cameras are not co-extensive. That is, the first camera captures imagery of the item during a first period, and the second camera captures imagery of the item during later period (which may, or may not, overlap with the first period). If a patch is visible to both cameras, the additional captured imagery allows more accurate virtual transformation of the depicted image patches to facilitate identifier discernment. A virtual planar reconstruction of the package surface is desirably generated using imagery from the two cameras.

Figure 3C:
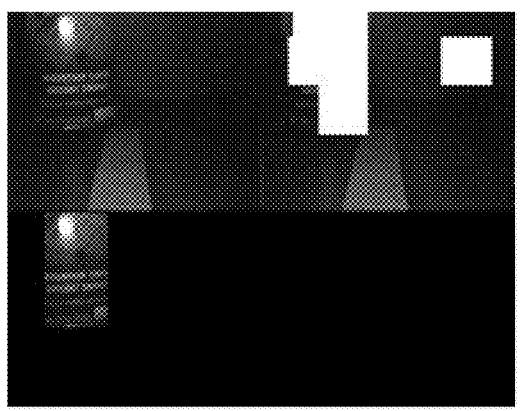
Figure 3D:
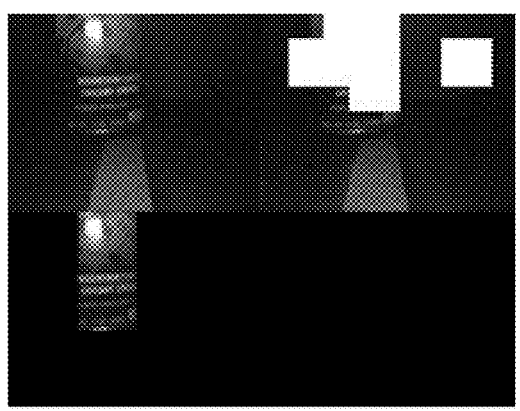
Figure 3E:
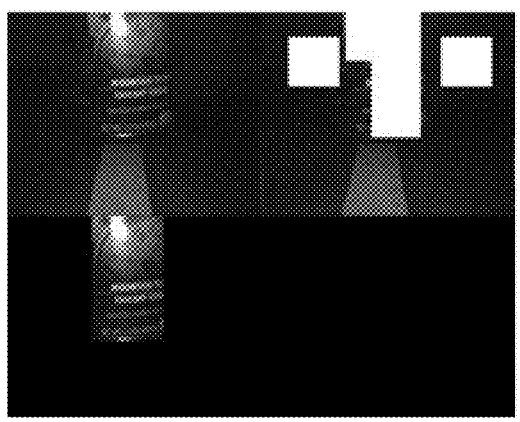
Figure 3F:
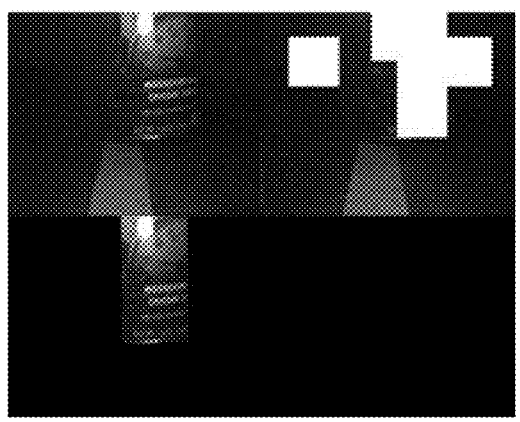
Figure 3G:
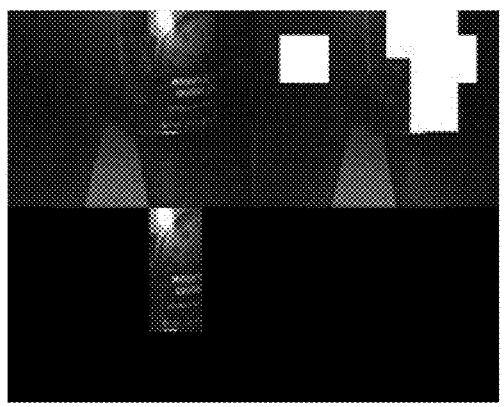
Figure 3H:
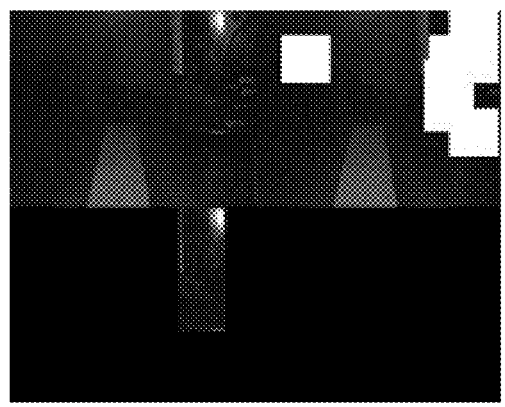
Figure 3I:
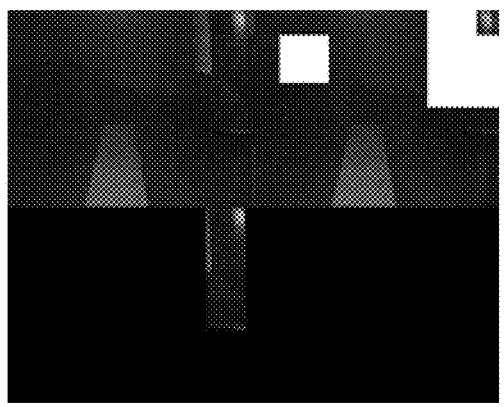
Figure 3J:
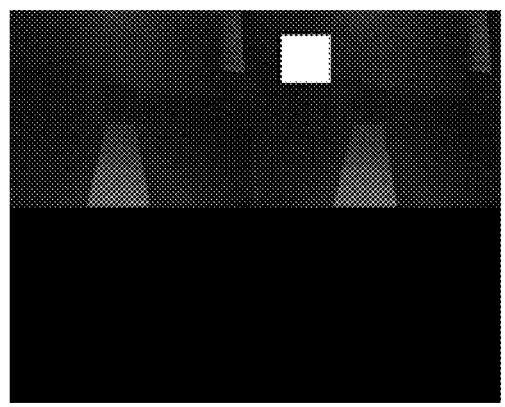

Fig. 3C shows another two-camera arrangement. This arrangement includes a first camera looking up through a glass window 32 in a checkout counter 33, and a second camera looking across the checkout counter through a window 34 in a vertical housing. The two cameras are positioned so that their camera axes intersect at right angles.

Segmentation techniques are used to identify different items within imagery captured by the two cameras. Feature points found in one camera's imagery within a segmented shape are matched with corresponding points in the second camera's imagery. If three or more such points are found in both images (e.g., as indicated by the "+" symbols in Fig. 3C), the orientation of the plane defined by such points can be determined by the positions of the three points in the two different images. (E.g., in the two-dimensional depiction of Fig. 3C, the orientation of the line 25 containing the three points causes the points to appear closer together in the imagery of camera 1 than in the imagery of camera 2.) With this clue as to the orientation of a product surface, imagery of the surface can be processed to remove associated perspective distortion (i.e., image rectification), prior to applying a watermark decoding algorithm to the imagery.

In other embodiments, three or more camera arrangements can be used.

In accordance with another aspect of the present technology, the checkout station captures imagery of different colors, e.g., by illuminating the area with different colors of light. The different colors of imagery can be captured simultaneously (e.g., by different cameras) or serially. The different frames of information can be processed to generate different information, or to serve different purposes.

One particular implementation illuminates the items with a repeating sequence of three colors: white, infrared, and ultraviolet. Each color is suited for different purposes. For example, the white light can capture an overt product identification symbology; the ultraviolet light can excite anti-counterfeiting markings on genuine products; and the infrared light can be used to sense markings associated with couponing and other marketing initiatives.

Different frames of captured imagery can be utilized to synthesized enhanced frames of imagery for use as described above (e.g., product identification, anti-counterfeiting, and marketing).

Other aspects of the present technology make use of one or more plenoptic cameras (sometimes termed multi-aperture sensors, radiance cameras, or light field cameras). Some such cameras employ an array of plural component cameras, typically formed on a common substrate, each with its own lens. These cameras may be viewed as sensing a 4D light field. From their collected data, they can produce frames of data at arbitrary focal planes. This allows captured imagery to be "focused after the fact."

For example, in Fig. 4A, a plenoptic camera system processes the data captured by its component sensors to yield a frame focused at focal plane "a." The same data can also be processed to yield a frame focused at focal plane "b" or "c."

The focal planes needn't be parallel, as shown in Fig. 4A. Instead, they can be non-parallel (e.g., focal planes "d," "e" and "f" in Fig. 4B). One particular technique for synthesizing tilted focal plane imagery is known to artisans from Vaish et al, Synthetic Aperture Focusing using a Shear-Warp Factorization of the Viewing Transform, 2005 IEEE Computer Society Conference on Computer Vision and Pattern Recognition, pp. 129-136.

In one embodiment, captured plenoptic information is processed to yield a first set of imagery having a focal plane coincident with a first plane through a volume that encompasses at least part of an item. The plenoptic information is also processed to yield a second set of imagery having a focal plane coincident with a second plane through said volume, where the first and second planes are non-parallel. The thus-processed information is then analyzed to discern object identification information.

Figure 5:
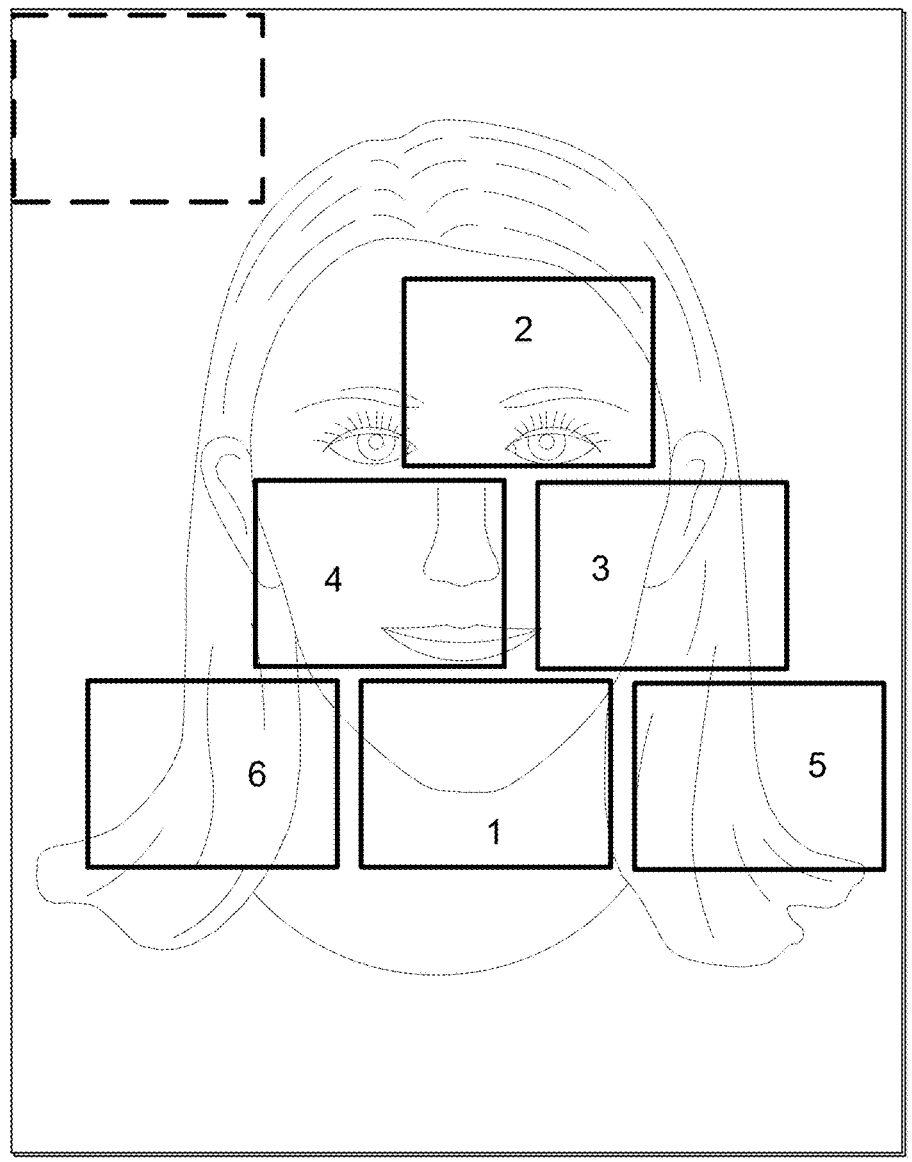
FIG. 5 shows an example detection block prioritization in an image frame.

Referring to Fig. 5 (which is a plan view looking down on a conveyor of an exemplary embodiment), the plenoptic information from camera 50 is processed to yield many different focal planes of imagery through a volume that encompasses the items on the conveyor. If the items are imagined as occupying a hemispherical region 52 on the conveyor 14, one focal plane 54 (shown in dashed lines) extends vertically up from the central axis 51 of the conveyor, bisecting the hemisphere. Three other planes 56, 58, 60 similarly extend up perpendicularly from the plane of the conveyor, spaced successively three inches closer to the edge 62 of the conveyor. (Three further planes – not shown, for clarity of illustration – are similarly disposed near the other edge 64 of the conveyor.)

In addition to this first plurality of parallel planes, the plenoptic data is also processed to yield a second plurality of focal planes that again extend vertically up from the plane of the conveyor, but are skewed relative to its central axis 51. The depicted planes of this second plurality, 66, 68, 70 and 72 correspond to the planes of the first plurality, but are skewed +15 degrees.

Although not shown in Fig. 5 (for clarity of illustration), additional sets of focal plane imagery are similarly derived from the plenoptic camera data, e.g., oriented at skew angles of +30, +45, and +60 degrees. Likewise, such planes are generated at skew angles of -15, -30, -45, and -60 degrees.

All the just-described planes extend vertically up, perpendicularly from the conveyor.

The plenoptic information is also processed to yield tilted focal planes, i.e., that do not extend vertically up from the conveyor, but instead are inclined. Counterparts to each of the above-described planes are generated at a tilt angle of 15 degrees. And others are generated at tilt angles of 30, 45 and 60 degrees. And still others are generated at tilt angles of -15, -30, -45, and -60 degrees.

Thus, in this exemplary embodiment, the plenoptic information captured by camera 50 is processed to yield a multitude of different focal planes of image information, slicing the hemispherical volume with planes every three inches, and at every 15 degrees. The resulting sets of image information are then analyzed for product identification information (e.g., by applying to watermark decoder, barcode decoder, fingerprint identification module, etc.). Depending on the location and orientation of the item surfaces within the examined volume, different of these planes can reveal different product identification information.

While plenoptic cameras are generally conceived as full color devices, they needn't be so for product identification. For example, a watermark signal may be encoded in product packaging in a red channel, and a corresponding monochrome (red) plenoptic camera can be used for decoding. In such a camera, the usual four-cell Bayer pattern of red/green/green/blue can be eliminated, and all of the sensor elements can sense red alone.

(Although described with reference to a single plenoptic camera, actual implementations can use two or more cameras, as shown in dotted lines in Fig. 5. Information from such plural cameras can be combined or otherwise used in concert.)

While detailed in connection with an embodiment employing plenoptic information, this concept of examining plural different focal planes of imagery for product identification information can be implemented in other manners. One is to use a fixed focus camera to capture a single plane of imagery, and provide the imagery to a GPU that applies a collection of different image transformations. For example, the GPU can apply a +15 degree corrective perspective transform. This process has the effect of taking any physical surface inclined -15 degrees relative to the image focal plane (i.e., inclined -15 degrees to the camera sensor in typical embodiments), and warp it so that it appears as if it squarely faced the camera. (Desirably, the scene is adequately lit so that the captured imagery has a depth of field that spans the surface being imaged.) The GPU can similarly re-project the original imagery at horizontal tilts of -60, -45, -30, -15, +15, +30, +45, and +60 degrees, and at vertical tilts -60, -45, -30, -15, +15, +30, +45, and +60 degrees. It can likewise warp the original image at each combination of these horizontal and vertical tilts. Each resultant set of image data can be processed by an identification module to extract object identification information.

(Before applying the captured image data to the GPU for perspective transformation, or before applying the GPU-transformed image data to the identification module, the data is desirably examined for suitable focus. Focused regions can be identified by their high frequency content, or their high contrast, as compared with out-of-focus imagery. Imagery that is determined to be out of focus needn't be further processed.)

If the depth of field of a conventional fixed focus camera is not adequate, known extended depth of field imaging techniques can be used (see, e.g., patents 7,218,448, 7,031,054 and 5,748,371).

In still other arrangements, the system uses a variable focus camera, and its focal plane is cyclically changed (e.g., mechanically or by fluid action) to capture successive planes of imagery at different focal lengths. These images are provided to a GPU to apply different image transformations, as detailed above.

A GPU is well suited for use in the detailed arrangements, because it employs a plurality of processing cores to execute similar instructions on several sets of data simultaneously. Such a GPU can likewise be employed to perform a watermark or barcode decoding operation, or a fingerprint extraction operation, or an OCR operation, on multiple sets of data (e.g., the differently-transformed image sets) simultaneously.

A GPU can also be used to perform processing of information acquired by a plenoptic camera arrangement. For example, a GPU can extract the different planes of focused imagery. Or another processor can extract parallel planes of focused imagery (e.g., planes 54 – 60 in Fig. 5), and then a GPU can perspective-transform these parallel planes to yield a diversity of other planes that are not parallel to planes 54-60. In still other arrangements, a GPU is employed both to process the captured information (to yield multiple sets of imagery in different focal planes), and also to process the multiple sets of imagery to extract identification information. In yet other arrangements, multiple GPUs are used, including in embodiments with multiple cameras.

Fig. 8 shows a checkout conveyor 14 carrying various items for purchase, from the perspective of an illustrative imaging camera. The items are arranged on the conveyor in such a manner that item 80 is largely obscured. Its position may be such that no barcode is ever visible to any camera as the item passes along the conveyor, and its visible surfaces may be too small to enable object recognition based on other technologies, such as image fingerprinting or digital watermarking.

In accordance with another aspect of the present technology, a 3D image segmentation algorithm is applied to determine the different shapes on the conveyor. The system associates the different segmented shapes on the conveyor with the different object identifiers derived from sensor information. If there is a mismatch in number (e.g., segmentation shows four items on the Fig. 8 conveyor, but the system may output only three product identifications), this circumstance is flagged to the operator. Image data highlighting the outlier item (i.e., item 80 in Fig. 8) can be provided to a supervisor for review and action, and/or a diverter can divert the item from the flow of items through checkout – for manual processing without stopping other checkout progress.

(For a review of illustrative segmentation algorithms, see, e.g., Wirjadi, Survey of 3d Image Segmentation Methods, Reports of Fraunhofer ITWM, No. 123, 2007. Two popular classes of segmentation techniques are thresholding and region growing. Related technology for dimensioning objects on a supermarket conveyor is detailed in patent 7,344,082.)

In accordance with a further aspect of the present technology, the checkout conveyor of Figs. 1 and 8 moves at a uniform rate. However, frames of imagery are not similarly captured at a uniform intervals. Instead, the system captures frames at non-uniform intervals.

For example, the camera imagery may reveal a gap between items in the longitudinal direction of the conveyor. (Such a gap "x" is shown between items 82 and 84 of Fig. 8.) When such a gap is present, it presents an opportunity to capture imagery depicting a product face that may be exposed only briefly (e.g., part 86 of face 85 of item 84 that is generally occluded by item 82). The system controls the camera to capture an image frame when part 86 is maximally revealed. If this instant comes at time t=175ms, and the system normally captures image frames at uniform intervals of 50ms, then an extra frame is captured at t=175ms (e.g., frames captures at 0ms, 50ms, 100ms, 150ms, 175ms, 200ms...). Alternatively, the system may delay or advance a regular frame of image capture so as to capture a frame at the desired instant (e.g., 0ms, 50ms, 100ms, 175ms, 200ms, 250ms...). Such an event-driven frame capture may establish the timing by which subsequent frames are uniformly captured (e.g., 0ms, 50ms, 100ms, 175ms, 225ms, 275ms...).

In an alternative arrangement, frame capture is performed at regular intervals. However, the system slows or pauses the conveyor 14 so as to allow image capture from a surface that is only briefly visible to the camera (e.g., part 86). After such image has been captured, the conveyor resumes its normal motion.

Fig. 9 shows a similar conveyor, but this time including a cylindrical article 90. (Only part of the cylindrical surface is visible; some is downward-facing, and the camera's view of another portion of its surface is occluded by item 84.)

According to another aspect of the present technology, text found in imagery serves as rotation-orientation information useful in extracting item identification.

Consider the cylindrical grocery items shown in Fig. 10A. Each includes prominent text, and the generally-horizontal line of text is inclined (up to the right, as shown by the dashed lines). However, despite such inclination, the up-down axis of each letter points vertically upward (shown by the solid arrows).

Fig. 10B shows a contrary case. Here the up-down axis of each prominent letter points to the side, i.e., 270 degrees clockwise from vertically upward. ("Prominent" text here refers to text that is larger than the smallest text visible on an item.)

Naturally, there are exceptions. But by and large, the up-down axis of the biggest text on an item (cylindrical or otherwise) is generally parallel with one of the principle axes of the item.

As is familiar to artisans, digital watermarking patterns are typically applied to items in a tiled fashion, with a single square watermark pattern being replicated across and down the item being watermarked. Fig. 12 shows an example. Here artwork for a box of cereal is digitally watermarked with tiled patterns. The tiles are typically embedded with an upper left corner (indicated by an "x") of a first tile coincident with the upper left corner of the artwork. Tiles are then placed across and down from this starting point.

Each watermark pattern has an orientation (indicated by the arrows in Fig. 12). Again, common practice is to embed the watermark tiles so that they are oriented in the same manner as the artwork (i.e., with "up" in the artwork corresponding to "up" in the watermark pattern).

To read the watermark from image data, the watermark decoder must first determine the orientation of the watermark tiles. The watermark decoder's work may be eased, and decoding speed may be increased, if this task of determining orientation is shortcut in some fashion.

The up-down orientation of prominent text on packaging often provides gives such a shortcut. The orientation of the letter "C" in Cheerios in Fig. 12 indicates the orientation of the watermark encoded in the cereal box artwork.

Likewise, the orientation of the prominent text on the items of Fig. 12 indicates the orientation at which a watermark on these items likely is to be found.

If a watermark decode operation, based on an assumption that the watermark is oriented in the same direction as the prominent text, fails, a second watermark decode operation can be tried – this one assuming that the watermark is oriented 90 degrees from the orientation of the biggest text. Such is the case with the Coke can of Fig. 10B. (That is, the watermark pattern is applied as on the cereal box of Fig. 12, with the top of the watermark tile being oriented towards the top of the product, which in Fig. 10B is 90 degrees clockwise from the orientation of the prominent text "Coke.")

Returning to the conveyor example, a segmentation module identifies and extracts the portion of the camera imagery depicting the shaded surface of item 90. (Known 2D segmentation can be used here.) This image excerpt is passed to a text detector module that identifies at least one prominent alphabetic character. (Known OCR techniques can be used.) More particularly, such module identifies a prominent marking in the image excerpt as being a text character, and then determines its orientation, using various rules. (E.g., for capital letters B, D, E, F, etc., the rules may indicate that the longest straight line points up-down; "up" can be discerned by further, letter-specific, rules. The module applies other rules for other letters.) The text detector module then outputs data indicating the orientation of the analyzed symbol.

For clarity of illustration, the depicted surface includes only a single letter, a "B." The text detector module outputs data indicates that this letter is presented in the image excerpt at an orientation of 202 degrees (Fig. 13).

With this as a clue as to the orientation of any embedded watermark, the system next rotates the image excerpt clockwise 158 degrees, so that the "B" is oriented vertically (i.e., 0 degrees), as shown in Fig. 14A. A watermark decode operation is then attempted on this excerpt. The decoder looks for a watermark pattern at this orientation. If unsuccessful, it may further try looking for the watermark pattern at small orientation offsets (e.g., at selected orientation angles +/- 8 degrees of the Fig. 14A orientation).

If no watermark is found, the system can next rotate the image excerpt a further 270 degrees clockwise, to the orientation depicted in Fig. 14B. Again, the same decode operations can be repeated.

In some embodiments, if no watermark is then decoded, the system may conclude that there probably is no watermark, and curtail further watermark processing of the image excerpt. Alternatively, it may employ a prior art method to undertake a more exhaustive analysis of the image excerpt to try to find a watermark – considering all possible orientations (e.g., as detailed in the assignee's patent 6,590,996).

A variant embodiment is shown in Fig. 15. In this embodiment, the image excerpt is applied to a GPU, which uses one core to rotate it 30 degrees, another core to rotate it 60 degrees, and so on for all increments up through 330 degrees. All of these operations are performed simultaneously. Including the original image excerpt, there are 12 differently-rotated versions of the image excerpt. (12 was the maximum number that could be presented conveniently on a single drawing sheet; in actual practice there may be many more, e.g., 36 at rotational increments of 10 degrees, 120 at rotational increments of 3 degrees, etc.)

One approach is to examine each of these differently-rotated excerpts for a watermark – assuming the watermark is oriented "up" in the different depicted orientations (or within a small angular offset of +/- 15 degrees).

More economical, however, is for the system to rank the different rotation states based on the likelihood of finding a watermark at that orientation state. In the Fig. 15 example, the system ranks the 150 degree rotation as number 1, because this rotation orients the prominent text character "B" most nearly upright. If a watermark is present in the image excerpt, it will most likely be found by examining this number 1-ranked excerpt (again, +/- 15 degrees).

If no watermark is found, the system then considers the number 2-ranked excerpt. Here, the number 2-ranked excerpt is the one rotated 60 degrees. The system ranks this excerpt as number two because the orientation of the text character B is closest to 270 degrees (as in Fig. 10B). Again, the system applies a watermark decoding algorithm to this rotated version of the image excerpt – again examining nearby rotation states too (+/- 15 degrees).

If no watermark is yet decoded, the system may give up, or it may consider other rotational states (e.g., perhaps ranked number 3 because of the orientation of other detected text). Or, again, it may invoke a prior art method to search for a watermark of any rotational state.

While the foregoing discussion of text focused on cylindrical objects, the same principles are applicable to items of arbitrary shape.

Another implementation functions without regard to the presence of text in the imagery. Referring to Fig. 16, the system passes the segmented region to an edge finding module, which identifies the longest straight edge 98 in the excerpt. (In one implementation, only boundary edges of the segmented region are considered; in other, internal edges are considered too). The angle of this line serves as a clue to the orientation of any watermark.

(A variety of edge detection technologies are known to artisans. The Canny edge detection technique is popular. Others include Sobel and Harris edge detectors.)

In Fig. 16, there is directional ambiguity – there is no text symbol to indicate which direction is "up." Thus, two possible orientations are indicated, 202 degrees and 22 degrees in this example.

The system then rotates the Fig. 16 excerpt to make this longest line vertical, as shown in Fig. 17A. As described above, a watermark decoding operation is tried, assuming the watermark is oriented up in this image presentation. If such attempt fails, the system next rotates the excerpt a further 180 degrees (Fig. 17B) and tries again.

As described above, a GPU implementation can also be utilized, with the system ranking different rotation states for further analysis, based on directional clues – in this case the orientation of the long edge.

A still further implementation relies on circles, rather than straight lines or text. Supermarkets contain countless cylindrical items – mostly canned goods. Such items have two circular faces, which commonly are not printed (e.g., face 92 in Fig. 11). Yet the presentation of the circular face (or part thereof, as in Fig. 11) provides a clue as to the orientation of watermark encoding on an adjoining cylindrical surface.

Fig. 18 shows a can 102, as it might be viewed on a conveyor. Its circular end 104 (which may be a top or bottom), viewed obliquely, appears as an ellipse. An ellipse is characterized by major and minor axes. The major axis 106 is the longest diameter; the minor axis 108 is the shortest diameter. The minor axis can be used like the long edge of Fig. 16, as a clue to the watermark orientation. That is, the minor axis, if extended, crosses the label side of the can from top-to-bottom (or bottom-to-top), as shown by line 110. The orientation of this line typically corresponds to the orientation of the watermark printed on the can's cylindrical surface.

Thus, a system according to this embodiment of the technology uses the orientation of line 110 in Fig. 18 like the orientation of line 98 in Fig. 16. For example, an image excerpt depicting the can is rotated to make this line 110 vertical, and watermark decoding is tried. If unsuccessful, the excerpt is rotated 180 degrees, and decoding is tried again. Again, a GPU implementation can be utilized, with the system ranking the two rotations in which line 110 is oriented most nearly vertically as the most likely contenders.

Often, as in Fig. 9, only a segment of an ellipse is visible to the camera. The system can analyze captured imagery to find segments of ellipses, e.g., using curve fitting techniques, or using a Hough transform. See, e.g., Yuen, et al, Ellipse Detection Using the Hough Transform, Proc. Of the Fourth Alvey Vision Conf., 1988. Even from a segment, the direction of the minor axis can be estimated, and used as above.

One way of determining the minor axis of an ellipse, and thus of determining the up-down orientation of the cylindrical object (e.g., line 110 in Fig. 18), is to examine the curvature of the ellipse.

Again, Hough or curve fitting techniques are used to identify an elliptical edge in an image excerpt. Consider Fig. 19, which shows an excerpt 118 of an ellipse – the remainder of the ellipse being occluded from the camera's view by other items on the conveyor. (Other parts of the captured imagery in which this excerpt is found are omitted for clarity.)

The minor axis of an ellipse passes through the point of minimum curvature on the elliptical edge. The curvatures at different points along this edge are determined by a curvature module, and the point 120 at which curvature is at a minimum is thereby identified. A tangent 122 to the curve at this point is identified by the curvature module. The minor axis of the ellipse lies along the perpendicular of this tangent, e.g., along line 124.

Sometimes, the point along an ellipse at which curvature is minimized is not depicted in the captured imagery (e.g., due to other objects blocking the camera's view). Even in such case, the "up-down" orientation of the cylinder can still be determined.

Consider Fig. 20, which shows the same ellipse 118 as Fig. 19, but more occluded. That is, the point of minimum curvature is not depicted.

In this case, the curvature module is used to detect the point of maximum curvature along the edge (i.e., point 126). The curvature module then determines a line 128 tangent to the edge at this point. The orientation of this line typically matches the "up-down" orientation of the digital watermark in the product label that adjoins the curve. As described above, the system rotates the image excerpt to re-orient line 128 vertically, and tries a watermark decoding operation. If unsuccessful, it rotates the image excerpt 180 degrees and tries again. Again, a GPU can perform a plurality of rotations of the imagery in parallel, and the system can consider certain of these in ranked order (i.e., giving first attention to those orientations at which line 128 is most nearly vertical).

Items imaged on the conveyor belt – regardless of their configuration (can or rectangular carton, etc.) commonly are depicted with perspective distortion. Fig. 21 illustrates how the face of the Fig. 12 cereal box, lying face-up on the conveyor belt, might be depicted in camera imagery. (The markings used to explain watermark tiling are again included in this depiction, but of course are not overtly visible in the camera imagery.)

To decode the watermark, it is helpful to first restore the depiction of the item to its proper aspect ratio.

One approach uses image segmentation to identify different items in the field of view. Most physical items are characterized by perpendicular edges (e.g., a cereal box is a rectangular cuboid; a can is a right cylinder). The edges discerned from the segmented imagery are examined to determine if any pair of edges is nearly parallel or nearly perpendicular (i.e., within, e.g., 20, 10 or 5 degrees or less). The physical edges to which these depictions correspond can be assumed to be truly parallel or perpendicular, with the angular variance in the depicted image due to perspective distortion. A corrective perspective transformation is then applied to restore these edges to parallel or perpendicular relationship.

While simple, this technique breaks down when the item does not have nearly straight edges (e.g., a bag of frozen peas), or if the items are arranged on the conveyor so that certain edges of an item are blocked from the camera's view.

Another approach simply characterizes the perspective distortion of the camera across its field of view, in a calibration operation – before use. This information is stored, and later recalled to correct imagery captured during use of the system.

One calibration technique places a known reference pattern (e.g., a substrate marked with a one-inch grid pattern) on the conveyor. This scene is photographed by the camera, and the resulting image is analyzed to discern the perspective distortion at each 2D location across the camera's field of view (e.g., for each pixel in the camera's sensor). The operation can be repeated, with the calibrated reference pattern positioned at successively elevated heights above the plane of the conveyor (e.g., at increments of one inch). Again, the resulting imagery is analyzed, and the results stored for later use.

In like fashion, a vertical gridded substrate can be placed perpendicularly across the conveyor. Imagery is captured and analyzed to discern perspective distortion in that plane. Again, the process can be repeated with the substrate moved to successive positions along the conveyor (e.g., at increments of one inch), to discern the apparent distortion of imagery captured at such planes.

Similarly, the gridded substrate can be placed longitudinally along the axis of the conveyor. Imagery can be captured and analyzed to discern apparent distortion of surfaces in that plane. Again, the substrate can be moved, and the operation repeated, at successive parallel planes.

When imagery is thereafter captured of items on the conveyor, this reference data can be consulted (and interpolated, e.g., for physical items presented tilted surfaces) to discern the perspective distortion that influences each part of the captured imagery. Corrective counter-distortions are then applied before the imagery is passed to the identification module.

Correction of perspective distortion is a familiar exercise in image processing and photogrammetry. A variety of other techniques for image "rectification" are known in the art. (Many of the prior art techniques can be applied in simplified form, since the camera position and optics are typically fixed, so associated camera parameters can be determined and employed in the correction process.) If imagery from two different viewpoints is available, the stereo information provides still further opportunities for image correction.

Reference was made, above, to use of detected text as a way of discerning rotation-orientation, but it is also valuable as a metric of perspective distortion.

Most product labels use fonts in which vertical letter strokes are parallel. For example, in Fig. 29, the two vertical letter strokes in the letter "M" of "Mixed" are parallel. Put another way, most fonts have consistent letter widths, top to bottom. Again in Fig. 29, the letter "M" has the same width across its bottom as across its top. (So do the letters "x" and "u" etc.)

Similarly with most straight lines of text: the letters have consistent height. Most "tall" letters (t, k, l, etc.) and capital letters extend from the base text line to a first height, and any "short" letters (w, e, r, etc.) all extend to a second, lower, height. Lines along the tops and bottoms of the letters are generally parallel. (See lines "a," "b" and "c" in the first line of text in Fig. 29.)

Divergence from these norms is useful as a measure of perspective distortion. When detected by a corresponding detection module, a corrective image distortion is applied to restore the lines to parallel, and to restore the widths of letters to consistent values – top to bottom. Watermark detection is then applied to the correctively-distorted image.

Fig. 30 shows that perspective warps can arise in two perpendicular dimensions, here termed "tilt" and "tip." "Tilt" refers to a surface orientation that is inclined in a horizontal direction, to the right or to the left, from a straight-on, plan, view. Tilted-left refers to an orientation in which the left edge of the surface is at a greater focal distance from the camera than the center of the object. "Tip" refers to a surface orientation that is inclined in a vertical direction. Tipped back refers to an orientation in which the top edge of the surface is at a greater focal distance from the camera than the center of the object.

Fig. 30 also shows small arrows that are intended to indicate directions of surface-normals from the depicted cereal box. In the tilted-left case, the surface normal is inclined to the left – as seen by the camera. In the tipped-back case, the surface normal is inclined upwardly, as seen by the camera.

A gross sense of perspective can be obtained by reference to techniques noted herein, such as the text lines of Fig. 29. If the lines converge as they move to the right, the right part of the label must be further from the camera, indicating a tilted-right pose.

Another gross sense of perspective can be obtained from the scale of the watermark tile. Referring again to Fig. 21, if the watermark tiles are smaller in scale towards the top of the object, this indicates the top of the object is more distant, i.e., a tipped-back pose. Other tip- and tilt-states are similarly indicated by different scales of the depicted tiles. (The scale of the preferred watermark tile is readily revealed from a log-polar plot of the embedded calibration signal, as detailed in patent 6,590,996.)

As indicated, if the orientation of the surface is accurately discerned (e.g., by analyzing two frames of imagery showing different viewpoints, and considering positions of keypoints in each), imagery can be distorted so as to accurately counter-act the apparent distortion – restoring it to a plan presentation. Object identification can then proceed on the basis of the corrected imagery.

If, instead of accurate orientation information, the system only has gross orientation information (e.g., tilted left, or tipped back, such as from fast analysis of letter shape or non-parallel lines), different counter-distortions can be tried. For example, if the object appears to be tipped back, but the amount of tip is uncertain, then the object identification module can first try to extract a watermark from the captured imagery without any correction. If unsuccessful, an image processing module can counter-distort the image to impose a perspective as if the image focal plane is tipped-forward 20 degrees (i.e., countering the tipped-back apparent presentation). The object identification module again tries to extract a watermark. If unsuccessful, a further corrective counter-distortion is applied, e.g., processing the original image to impose a perspective as if tipped-forward 30 degrees. The object identification module again tries to extract a watermark. If unsuccessful, a still further corrective warp is applied (e.g., imposing a perspective as if the focal plane is tipped forward 36 degrees). Etc.

Again, a GPU is well suited for such tasks – allowing the just-detailed sequence of attempts to be performed in parallel, rather than serially.

In the case of cylindrical objects, correction of cylindrical warping may be employed, to account for the apparent spatial compression of the packaging artwork as the curved surface recedes from view. (This correction can be applied separately from perspective correction, or as part of a combined operation.)

Ignoring perspective, Fig. 22 shows an isometric view of a cylindrical object, viewed obliquely. Cylindrical distortion is at its maximum where the cylindrical surface curves out of view. It is at its minimum along a center line parallel to the cylinder axis, along the part of the surface closest to the camera. (This is the same line defined by extension of the minor axis 108 of the ellipse, discussed with Fig. 18.) If the cylinder is fully visible (i.e., it is not occluded by another item), this line of minimum cylindrical distortion bi-sects the visible cylindrical face, as shown by the dark, long-dashed line 129 of Fig. 22. The other dashed lines – closer to the edges – are in regions of progressively more spatial compression, causing the lines to appear closer together. (The dashed lines in Fig. 22 are at 20 degree spacings around the cylinder.)

Fig. 23 shows an excerpt of Fig. 22, as might be passed to an object recognition module. The cylindrical item is first segmented from the background. Its up-down axis is next assessed, by reference to text, edges, ellipse features, or otherwise. The image excerpt is then rotated based on the assessed orientation information, yielding Fig. 24.

A cylindrical warp correction is next applied, counteracting the compression near the edges by applying a compensating horizontal expansion. Since the image excerpt spans the full width of the cylinder, and its boundaries were detected by the image segmentation (shown as the solid lines), a straightforward trigonometric correction function is applied.

In particular, if the distance from center line to the edge is a distance "x," then any intermediate distance "y" from the center line corresponds to an curvature angle theta ($\theta$) – from the cylinder's apparent center line – of arcsin (y/x). The horizontal scaling factor to be applied at this distance from the center line is $1/\cos(\theta)$.

By such procedure, the Fig. 24 image is horizontally warped to yield a curvature-compensated Fig. 25. (The outline is no longer shown, as it is a curved shape that is difficult to reproduce. The image data would typically encompass the full visible surface of the cylinder, segmented from the camera's view of the conveyor, as opposed to the rectangular excerpt illustrated.) It will be recognized that the dashed lines – at uniform angular spacings of 20 degrees, are now at uniform spatial distances in this 2D representation. Thus, it is as if any label were removed from the cylindrical item, and viewed straight-on.

The compensated image data of Fig. 25 is then processed to yield object identification (e.g., by a watermark decoding module, etc.).

The case just-described, in which the cylindrical object is fully-viewable, and its side edges are unambiguous, is straightforward. More challenging are instances where these criteria are not met. Fig. 26 is an example.

In this captured image, much of the cylinder 130 – including the entirety of one side edge, and part of the other – are occluded by item 132. Part of one side edge 134 is visible. While this edge line might be due to other features of the imagery, it is most likely the edge of cylindrical object, because the edge detector module finds a point of intersection 136 between this edge 134 and an elliptical curve 138 in the imagery.

As described above, e.g., in connection with Figs. 13-20, the cylindrical surface is segmented from the imagery, and rotated to a likely up-down orientation, as shown in Fig. 27. (This rotation can be based, e.g., on lettering on the cylinder, or the ellipse section 138.) The position of the edge 134 is known, but the position of the center line of minimum distortion (corresponding to the long-dash line 129 of Fig. 24) is uncertain. Is the center line a line 140a that is distance x1 from the edge, or a line 140b that is a distance x2 from the edge, or some other line?

An exhaustive search is performed, e.g., at least partly employing a GPU – assuming different locations for the center line, performing the cylindrical compensation corresponding to that assumed center line, and then attempting to perform an item identification (e.g., by watermark decoding). At some assumed value of "x," the compensation yields an item identification.

The exhaustive search is not unbounded. The system knows that the center line cannot be to the right of line 142, nor to the left of line 144. It can't be right of line 142 because this is the mid-point of the exposed width 145 of the cylinder face, and the occluded portion of the cylinder is to the left. It can't be to the left of line 144, because the system curve-fits an ellipse 146 to the segment of the ellipse revealed in the imagery, and the center line cannot be to the left of this ellipse. (Indeed, it should be well to the right from line 144.)

The search may preferably start with an assumed center line based on the fitted ellipse 146, e.g., mid-way across its width – as shown in by line 148. The system then iterates from that starting point – trying lines at increasing distances either side of the assumed center line 148, in an attempt to extract an item identifier.

(A still simpler approach is to extend the minor axis of the fitted ellipse 146, and use this as the starting point for the center line. Such approach does not work in Fig. 27 because the view in Fig. 26 on which Fig. 27 is based uses only one-point perspective, rather than two, so the elliptical face of the cylinder is not accurately presented: it is presented as a section of a circle.)

Fig. 28 shows a still more challenging scenario, in which the single edge boundary 134 of Fig. 27 is also occluded. Lettering detected on the item has been used to orient the segmented excerpt to an approximate up-down orientation.

In this case, a two-dimensional exhaustive search is done – varying both the assumed location of the edge of the cylinder, and also its assumed center line. That is, the system searches across different curvature states (one metric is the cylinder's radius of curvature, x), and cylinder locations (one metric is the location of the cylinder axis, as viewed from the camera).

Again, since part of the elliptical edge defined by the top of the item is detectable, the system fits an ellipse 146 to this edge, which helps bound the location of the partially-occluded cylindrical surface. In particular, the system starts by assuming that the boundary edge of the cylindrical surface is on line 150 – dropped from the edge of the fitted-ellipse nearest the segmented imagery. It further assumes that the center line of the cylindrical surface is on line 152 – dropped from the center of the ellipse. Both are then alternately iterated from these starting positions.

As before, for each trial location of the boundary and center lines, the system applies a corresponding corrective warp to "flatten" the presumed cylinder, and then attempts object recognition using the compensated image excerpt.

At some limiting point in the iteration, if object identification has not succeeded, the attempt terminates.

It will be recognized that multiple attempts may be required to extract an identifier (e.g., a watermark) from a partially-revealed cylindrical surface. For example, the estimated up-down orientation may need to be iterated. So, too, the assumed locations of the center line of the curved surface, and an edge location. If perspective is not calibrated in advance, then this too may be iterated. Fortunately, given the capability of multi-core devices, such processing can be effected within the typical time constraints of checkout systems.

Moreover, most item recognition technologies are robust to certain image distortions. For example, watermarks are commonly decoded at 50-200% of original scale, and with 15 degrees or more of perspective distortion. And some watermarks are fully robust to all rotation angles (although detection shortcuts may be implemented if the detector needn't consider all possible rotations). Still further, a complete watermark payload can be extracted from a single tile of watermarked artwork, so in the case of cylindrical objects, a small fraction of whatever surface is exposed will often suffice for decoding. (Barcodes do not have this latter advantage; the barcoded portion must be on the exposed surface. However, barcodes are similarly robust to rotation and scale, and presently are more robust to perspective.)

Due to the decoding latitude afforded by such robustness, the iterative increments in the described embodiments can be relatively large. For example, in Fig. 28, the positions of lines 150 and 152 may be moved laterally a distance equal to 20% of their spacing as an iterative step.

Some implementations may disregard cylindrical distortion, recognizing that a complete watermark tile is less than two inches across, and the side surface of the can closest to the camera may present an axially-oriented strip of label at least two inches in width. Although curved, the cylindrical distortion of this strip is relatively small. Such implementations may prefer to apply the thereby-waved processor effort to address perspective distortion, instead.

It will be understood that techniques like those detailed above can also be adapted for application to item shapes other than cylindrical.

If a conveyor is not present, and the objects are positioned before a camera system by hand, the system can compile a history (histogram) about the pose at which items are most commonly positioned for reading. That is, each time an object is successfully identified (by whatever technology), the system records information about the 3D orientation at which the object was presented to the checkout station (and, optionally, the path along which it traveled). The data may be collected on a per-cashier basis (or per-customer, for self-serve checkouts), to account for the different habits of different users. (Cashiers typically "sign-in" to POS systems, e.g., entering an employee ID and password on a keypad or similar device. Customers may identify themselves by loyalty card.) Once historical object-presentation data has been collected, it can be used to optimize the system's decoding procedure.

For example, if cashier A usually presents items to a camera system tipped-back and tilted-left, the system can apply corrective corresponding counter-distortions to the captured imagery – perhaps without even analyzing the captured imagery to estimate pose. If the cashier's next-most-common presentation is tipped-back and tilted-right, then a compensation adapted to this presentation can be tried if the first-compensated image fails to yield an object recognition.

Conversely, if cashier B usually presents items tipped-forward and tilted left, then a different, corresponding, correction can be applied to images captured at that cashier's station, etc.

The same techniques can be applied to conveyor-based systems. Over time, the system may discern the "canonical" way that objects are placed on the conveyor. Image processing can account for such typical placements by tailoring the order that different identification techniques are applied.

Different objects may be habitually presented, or placed (on a conveyor), differently. After an object has been identified, its presentation/placement data can be stored in association with the object ID and other identifying information, to compile a rich source of characteristic presentation information on a per-item-type basis.

Cashier A may most commonly present cereal boxes tipped-back and tilted left, but may present 12-packs of soft drinks tipped-forward. The system can acquire certain identification information (e.g., straight-edges or curvilinear shape, color histogram, temperature, weight, etc.) from sensors, and use this information to determine the most common presentation pose of objects having such attributes, and apply different image distortions or other identification techniques accordingly based on such sensor data.

As before, a GPU can effect multiple such image counter-distortions in parallel. When cashier A is using the system, the GPU may effect a different collection of image counter-distortions than when cashier B is using the system.

In some ways, it is easier to perform product identification on conveyor-based systems than hand-scanning systems. This is because the orientation of the products typically is constrained, in some fashion, by the conveyor – easing the recognition task. For example, a can nearly always rests on one of its two flat ends or – less likely – is positioned on its side, with its cylindrical axis parallel to the conveyor plane. This substantially limits the universe of camera views that might be encountered. Similarly, boxed-goods are regularly positioned with a planar surface facing down. This causes the adjoining four surfaces to all extend vertically, and the top surface to be disposed in a plane parallel to the conveyor. Again, this confines the range of poses that may be expected. (These are examples of the canonical poses referenced earlier.)

In like fashion, a conveyor imparts common, straight-line, movement to all objects resting on it. This makes the computational task of discerning surface orientations easier, since feature points recognized from two images – captured by a single camera at two different instants – have all moved the same distance in the same direction. (If one point moves 100 pixels, and a second point moves 50 pixels, then the second point is more remote than the first, etc.)

The difficulty of conveyor-based systems is that the camera's view of one product may be occluded by another. In contrast, hand-scanning systems typically present a single item at a time to the camera.

While the foregoing description focused on watermark decoding, it will be recognized that object identification by pattern recognition (e.g., fingerprinting, product configuration, etc.) is also simplified by understanding the rotational and perspective state of the object depiction, from a normal, or reference, presentation. Thus, for example, with SURF fingerprint-based recognition, the discerned feature points in a camera image may more quickly be matched with corresponding points in a reference image if the object depiction in the camera image is transformed to correspond to that in the reference imagery.

In some embodiments, rotational orientation is not important. For example, the watermarking arrangement detailed in Digimarc's patent 6,590,996 is fully robust to rotation. In such embodiments, computational effort is better focused on determining the inclination of the object surface, and perspective distortion.

In some embodiments, information determined through one recognition technology is useful to another. For example, by color histogram analysis, the system may make a tentative identification of an item as, e.g., a six-pack of Coke. With this tentative identification, the system can obtain – from the database – information about the configuration of such product, and can use this information to discern the pose or orientation of the product as depicted in the camera imagery. This pose information may then be passed to a digital watermark decoding module. Such information allows the watermark decoding module to shortcut its work (which typically involves making its own estimation of spatial pose).

In another example, image fingerprinting may indicate that an item is likely one that conveys a digital watermark on its packaging. The image fingerprinting may also provide information about the item's affine representation within the captured imagery. The system may then determine that if the image is rotated clockwise 67 degrees, the watermark will be easier to read (e.g., because it is then restored to its originally encoded orientation). The system performs a virtual 67 degree rotation of the imagery, and then passes it to a watermark decoding module.

Watermark indicia – like barcode indicia – cannot be decoded properly if they are depicted at too great an angular skew. In accordance with another aspect of the present technology, products for sale in a retail store are watermarked with multiple watermarks – pre-distorted to aid off-axis reading. In an exemplary arrangement, the watermark pattern (e.g., a watermark tile, as detailed in patent 6,590,996) is affine-distorted eight different ways (horizontally/vertically). The eight affine-transformed tiles are summed with the original tile, and this composite pattern is applied to the product or its packaging. The following Table I shows the nine component watermark tiles:

If a product surface bearing this watermark pattern is tilted up, away from the camera by 45 degrees, component tile #8 in the above list still will be readily readable. That is, the 45 degrees of upward physical tilt, counteracts the 30 degrees of downward affine transformation of tile #8, to yield a net apparent upward skew of 15 degrees – well within the reading range of watermark decoders.

(In a variant embodiment, the composite watermark tile additionally or alternatively includes component tiles of different watermark scales. Similarly, the composite watermark tile can include component tiles that have been warped in non-planar fashion. For example, different curvilinear warps can be used in anticipation of sensing watermarks from curved surfaces, such as canned goods, viewed from different perspectives. In some embodiments, different watermark patterns may be applied in tiled fashion, e.g., one normal, an adjoining tile distorted to "tilt left," another adjoining one distorted to "tilt right," etc.)

In existing checkout stations, spinning mirrors are sometimes used to effect physical scanning of laser beams across product packaging. In accordance with a further aspect of the present technology, moving mirrors are used with camera systems to introduce different distortions (e.g., perspective distortions) in imagery provided to product identification modules.

For example, a camera may face a segmented cylinder having nine different mirrored surfaces. The cylinder may be turned by a stepper motor to successively present different of the mirrors to the camera. Each mirror reflects a differently-warped view of checkout items to a camera. These different warps may be, e.g., the nine different transformations detailed in Table I. For one frame capture, the cylinder presents an unwarped view of the imagery to the camera. For a next frame capture, the cylinder presents a view of the imagery as if skewed 30 degrees to the right, etc. The resulting sequence of frames can be provided, e.g., to a watermark decoder or other product identification module, for generation of product identification information.

In a related embodiment, moving mirrors serve to extend a camera's field of view – presenting scenes to the camera sensor that are otherwise outside the field of view of the camera lens.

Another useful approach to identifying unknown objects (e.g., reading watermarks from surfaces of unknown shape) is akin to a Taylor series expansion. First, assume the object is planar and squarely facing the camera. Try reading the watermark. If unsuccessful, use available data to make a best guess as to a planar slope term (e.g., tip and tilt). Apply a corrective counter-distortion based on the guessed surface slope term, and try reading the watermark. If unsuccessful, use available data to make a further refinement to the guess – adding a simple curvature term. Apply a corrective counter-distortion that is also based on the guessed curvature, and try reading the watermark. This process continues, each time further refining an estimate about the surface configuration, and each time trying to decode the watermark based on such estimate. Continue this procedure until time allocated to the task runs out, or until all available data useful in estimating product configuration has been applied. (Even in this latter case, "blind" attempts at image distortions that might allow watermark decoding may still be tried.)

Reference has been made to certain digital watermark indicia spanning a substantial portion of the packaging. This means at least 25% of the exposed surface area of the packaging. Increased performance can be achieved by increasing the coverage, e.g., to more than 50%, 75%, 90%, or 95%, of the exposed area – in some instances reaching 100% coverage.

While reference was made to processing imagery to counteract certain apparent distortions, this operation need not be done in the spatial (pixel) domain. Instead, the imagery may first be transformed into a complementary domain (e.g., the spatial frequency domain, or FFT domain). The desired counter-distortion can then be applied in this complementary domain.

Such arrangement is particularly favored in watermark-based object identification systems, because watermark decoding commonly operates on spatial-frequency domain data. The imagery can be FFT-transformed once, and then a variety of different distortions can be applied (e.g., by GPU), and each resulting set of data can be provided to a watermark detector. This is computationally easier than applying a variety of different distortions (e.g., by GPU) in the pixel domain, and then having to perform FFTs on each of the differently-distorted image sets, to perform similar watermark decoding.

While certain embodiments made use of image frames oriented at regular 15 degree increments, this is not essential. One alternative embodiment uses one frame parallel to the camera, four frames that are angled at least 20 degrees away from the first frame (e.g., two at +/-25 degrees in a horizontal direction, and two more at +/- 25 degrees in a vertical direction), and four more frames that that are angled at least 50 degrees away from the first frame (e.g., two at +/-55 degrees horizontally, and two at +/- 55 degrees vertically ). This set of nine image frames provides a good diversity of item views, allowing simple watermark and barcode decoders to reliably decode indicia from most surfaces viewable from a camera – regardless of the surfaces' orientations.

Volumetric Modeling, Etc.

A further aspect of the present technology concerns identification of items, e.g., piled at a retail checkout.

Such an arrangement starts with 3D information about the assembled merchandise piled at the checkout. This 3D data set can be generated using any of the techniques identified elsewhere herein, including stereoscopic imaging, single camera imaging in conjunction with a moving belt, Kinect sensor, time of flight camera, etc. Fig. 31 shows an illustrative 3D image – showing five objects on a conveyor belt.

This 3D information is processed to define plural component object volumes.

The science of reconstructing object volumes from imagery is an old one (e.g., Guzman, "Decomposition of a Visual Scene into Three-Dimensional Bodies," in <u>Automatic Interpretation and Classification of Images</u>, Academic Press, 1969). One of the landmarks in the field is Clowes, On Seeing Things, Artificial Intelligence, 2:79-116 (1971).

This earlier work was followed – largely at the MIT Artificial Intelligence Lab – by Waltz, Hoffman and others, who further refined algorithms for discerning component solid shapes based on information derived from imagery. Waltz, in particular, is known for his work on examining local properties in images (visible vertices and edges), and combining this information with geometrical rules to identify what polyhedra are depicted. His use of constraint propagation overcame combinatorial explosion problems to which certain earlier analytic methods were prone.

This volumetric object recognition research has been widely deployed in robotic "pick and place" applications. "Bin picking" is a common task in which a robot images known 3D shapes that are randomly distributed in a bin. The robot processes the imagery to identify a desired one of the shapes, and then manipulates an arm to remove the item from the bin and place it at a desired location.

While most such techniques rely on edge-derived geometries, some subsequent technologies shifted to analysis of point clouds (e.g., from range images/depth maps), to identify component shapes based on identification of surfaces. The recent commodification of ranging sensors (e.g., the Kinect sensor, and time of flight cameras) makes such approaches attractive for some implementations.

Additionally, a great deal of practical work has been done to reconstruct 3D building geometries from aerial cityscape images. That application is closely related to the retail checkout context, but on a different scale.

A few of the many writings detailing the foregoing include:

Brady, Computational Approaches to Image Understanding, MIT AI Lab, Memo 653, 1981;

Braun, Models for Photogrammetric Building Reconstruction, Computers & Graphics, Vol19, No 1, Jan–Feb 1995, pp. 109–118;

Dowson et al, Shadows and Cracks, MIT AI Lab, Vision Group, June, 1971;

Dowson, What Corners Look Like, MIT AI Lab, Vision Group, June, 1971;

Fischer, Extracting Buildings from Aerial Images using Hierarchical Aggregation in 2D and 3D, Computer Vision and Image Understanding, Vol 72, No 2, Nov 1998, pp. 185–203;

Haala et al, An Update on Automatic 3D Building Reconstruction, ISPRS Journal of Photogrammetry and Remote Sensing 65, 2010, pp. 570–580;

Handbook of Mathematical Models in Computer Vision, N. Paragios ed., Springer, 2006;

Hoffman et al, Parts of Recognition, MIT AI Lab, AI Memo 732, December, 1983;

Mackworth, Interpreting Pictures of Polyhedral Scenes, Artificial Intelligence, Vol 4, No 2, 1973, pp. 121–137;

Mundy, Object Recognition in the Geometric Era - a Retrospective, Lecture Notes in Computer Science, Volume 4170, 2006, pp. 3-28;

Shapira et al, Reconstruction of Curved-Surface Bodies from a Set of Imperfect Projections, Defense Technical Information Center, 1977;

Waltz, Understanding Scenes with Shadows, MIT AI Lab, Vision Group, November, 1971; and Zhao, Machine Recognition as Representation and Search, MIT AI Lab, AI Memo 1189, December, 1989.

The artisan is presumed to be familiar with the above-reviewed prior art, so it is not further detailed here.

Any of these prior art methods can be employed in the present application. However, for the sake of expository clarity, the technology is described with reference to a simple set of geometrical rules applied to edges.

Such a process begins by identifying straight and elliptical contours (edges), and associated vertices. Known edge-finding techniques can be used. Regions (surfaces) bounded by these edges are typically regarded as object faces.

Edge finding techniques based on Canny's algorithm are commonly employed. (See, e.g., Canny, A Computational Approach to Edge Detection, IEEE Trans. Pattern Analysis and Machine Intelligence, Vol. 8, 1986, pp. 679-714.) Canny edge finders are implemented in the popular OpenCV software library, e.g., version 2.4, which also includes a multitude of other useful tools, such as corner detectors, robust local feature detectors, ellipse-finders, etc.

Geometrical rules are applied to identify faces that form part of the same object. For example, as shown in Fig. 31A, if edges A and B are parallel, and terminate at opposite end vertices (I, II) of an edge C - - at which vertices parallel edges D and E also terminate, then the region between edges A and B is assumed to be a surface face that forms part of the same object as the region (surface face) between edges D and E.

Other rules are applied to discern locations of occluded features. For example, an edge that extends vertically downward, but that is interrupted (occluded) by an edge of a surface of a different object, is assumed to extend down to a common reference plane (i.e., the plane of the checkout stand), on which the objects are assumed to rest. (See, e.g., lines A and B in Fig. 31A.)

Such rules typically have exceptions. For example, some rules take precedence over others. Consider edge F in Fig. 32. Normal application of the just-stated rule would indicate that edge F extends all the way to the reference plane. However, a contrary clue is provided by parallel edge G that bounds the same object face (H). Edge G does not extend all the way to the reference plane; it terminates at the top plane of "Object N." This indicates that edge F similarly does not extend all the way to the reference plane, but instead terminates at the top plane of "Object N." This rule may be stated as: parallel edges originating from end vertices of an edge ("twin edges") are assumed to have the same length. That is, if the full length of one edge is known, a partially-occluded twin edge is deduced to have the same length.

Application of the above procedure to the 3D arrangement of Fig. 31 results in a segmented 3D model, such as is represented by Fig. 33. Each object is represented by data stored in memory indicating, e.g., its shape, size, orientation, and position. An object's shape can be indicated by data indicating whether the object is a cylinder, a rectangular hexahedron, etc. The object's size measurements depend on the shape. The size of a right cylinder, for example, can be characterized by its diameter and its length. Orientation can be defined – for a cylinder – by the orientation of its principal axis (in the three-dimensional coordinate system in which the model is defined). For a regular hexahedron, orientation can be defined by the orientation of its longest axis. The position of the object can be identified by the location of an object keypoint. For a cylinder, the keypoint can be the center of the circular face that is nearest the origin of the coordinate system. For a hexahedron, the keypoint can be the corner of the object closest to the origin.

Comparison of the 3D image of Fig. 31 to the segmented model shown in Fig. 33 shows that the model has extrapolated structure that is unseen in the image. For example, while Fig. 31 reveals that Object 3 is a cylindrical object, only a fraction of the object is actually shown; the rest of the object is occluded by other shapes.

Fig. 33 has extrapolated the shape of Object 3 as being a cylinder with a length-to-diameter ratio of about 2.7. (This roughly corresponds to the shape of a Pringles brand potato chip can.) But this shape is supposition. The only information that is known, for a fact, is the information captured by the sensor system and revealed in Fig. 31, i.e., that the length-to-diameter ratio of Object 3 is 1.0 or greater. A shorter cylinder, such as a Campbell's soup can, also meets this description.

(Using known photogrammetry principles, dimensional data can be extracted from imagery captured under controlled/calibrated conditions. A supermarket checkout is such a controlled environment. In the Fig. 31 case, Object 3 may be determined to have a diameter of 3 inches, and its top surface (together with that of Object 4) may be found to be about 8 inches above the reference plane.

In accordance with another aspect of the present technology, the uncertainty between what is known and what is extrapolated (assumed/supposed) is identified. In one particular implementation, this uncertainty is communicated to a human operator, or to another element of the data processing system. Fig. 34 shows one such manner of communication to a human operator, i.e., a graphical depiction of the pile of merchandise, with a zone of high uncertainty 40 highlighted on a display screen (e.g., by color, bolding, flashing, etc.), so as to alert a checkout clerk about a location that may be checked for additional merchandise.

One possibility, depicted in Fig. 35, is that the visible cylinder (Object 3) in Fig. 31 is actually a 4" tall can of soup, positioned atop a second can of soup that is wholly hidden.

It will be recognized that the pile of merchandise shown in Fig. 31, as modeled in Fig. 33, has much uncertainty. For example, the human viewer will perceive (and rules followed by the present system can indicate) that the segmented model depiction of Object 2 and Object 4 are also uncertain. (Object 3 is probably more uncertain, since cylinders with a length-to-diameter ratio of 2.7 are relatively rare in supermarkets, whereas hexahedrons of the dimensions depicted for Objects 2 and 4 in Fig. 33 are relatively more common.)

Other segmented shapes in Fig. 33 are of relatively high certainty. For example, due to the prevalence of regular hexahedrons in supermarkets, and the rarity of any other shape that presents an appearance like that of Object 1 and Object 5 without being a hexahedron, the system can assign a high certainty score to these objects as depicted in Fig. 33.

As just indicated, the system desirably applies rules to compute – for each segmented shape in Fig. 33 – a confidence metric. As additional information becomes available, these metrics are revised. For example, if a second view of the pile of merchandise becomes available (e.g., from another sensor, or because the pile moves on a conveyor), then some previously-occluded edges may be revealed, giving greater (or less) certainty to some of the segmented volumes in Fig. 33. In some cases, the segmented model of Fig. 33 is revised, e.g., if the additional data includes evidence of a new item not previously included in the model.

The confidence metric can be based, at least in part, on statistical data about the different products offered for sale in the supermarket. This statistical data can include dimensional information, as well as other data – such as historical sales volumes per item. (If the supermarket sells 100 cans of Pringles potato chips in a month, and 2000 cans of Campbell's soup, then the confidence score for Object 3 will be lower than if the sales volumes for these items were reversed.)

The particular formula for computing a confidence metric will depend on the particular implementation, and the available data. One particular formula comprises an equation in which different metrics are weighted to different degrees in accordance with their importance, and combined, e.g., in a polynomial expression.

The following exemplary confidence metric equation uses input data M1, M2, M2 and M4 to yield a score S for each segmented object. Factors A, B, C, D and exponents W, X, Y and Z can be determined experimentally, or by Bayesian techniques:

$$S = (A*M1)^W + (B*M2)^X + (C*M3)^Y + (D*M4)^Z$$

The uncertainty zone shown in Fig. 34, which is brought to the attention to the human clerk (or other system component), can be threshold-defined, using the computed confidence metric. For example, if Object 3 has a confidence metric of 20 (on a scale of 1-100), and if Objects 1, 2, 4 and 5 have confidence metrics of 97, 80, 70 and 97, respectively, then the uncertainty zone is as depicted in Fig. 34 if the threshold is set to highlight uncertainty zones associated with objects having confidence metrics less than 50.

However, if the threshold is set at 75, then a further uncertainty zone – associated with Object 4, would also be highlighted.

(In a variant embodiment, a binary approach to uncertainty is adopted. Segmented shapes either have certainty or they don't. For example, in Fig. 33, Objects 1 and 5 may be determined to be certain, while Objects 2, 3 and 4 are not. Uncertainty zones associated with the latter are flagged, e.g., for possible follow-up.

In accordance with a further aspect of the present technology, the system's assessments about the different segmented shapes are refined by reference to other sensor data. That is, the system employs other information to help refine an evidence-based determination, e.g., about certainty or shape.

Consider Object 4, which is largely occluded in Figs. 31 and 33. Scale information extracted from the imagery may indicate this item has a planar (top) face measuring about 2.2" x 6". Many items in the supermarket inventory meet this criteria. However, if imagery is also available from an infrared camera, this item may be found to be at a temperature below freezing. Many boxed frozen vegetables (e.g., spinach) have a planar surface of this dimension, but such products commonly do not have a long dimension of 8", as extrapolated in Fig. 33. Based on the additional evidence contributed by the thermal image data, the system may reduce the confidence score for Object 4, e.g., from 70 to 40.

A great variety of other information can be used in this manner. Consider, for example, that the image of Fig. 31 may reveal identification markings on the cylindrical face of Object 3 exposed in that view. Such markings may comprise, for example, a barcode, or distinctive markings that comprise a visual fingerprint (e.g., using robust local features). A barcode database may thereby unambiguously identify the exposed cylindrical shape as a 10.5 oz. can of Campbell's Condensed Mushroom Soup. A database of product information – which may be the barcode database or another (located at a server in the supermarket or at a remote server) – is consulted with such identification information, and reveals that the dimensions of this Campbell's soup can are 3" in diameter and 4" tall. In this case, the model segmentation depicted in Fig. 33 is known to be wrong. The cylinder is not 8" tall. The model is revised as depicted in Fig. 36. The certainty score of Object 3 is increased to 100, and a new, wholly concealed Object 6 is introduced into the model. Object 6 is assigned a certainty score of 0 – flagging it for further investigation. (Although depicted in Fig. 36 as filling a rectangular volume below Object 3 that is presumptively not occupied by other shapes, Object 6 can be assigned different shapes in the model.) For example, Objects 1, 2, 3, 4 and 5 can be removed from the volumetric model, leaving a remaining volume model for the space occupied by Object 6 (which may comprise multiple objects or, in some instances, no object).

A task list maintained by the system is updated to remove identification of Object 3 from identification tasks to be completed. That part of the pile has been identified with sufficient certainty. Knowing its shape, the geometrical model of the pile is updated, and the system continues with other identification tasks.

The position of a barcode (or other marking) on an object is additional evidence – even if the captured imagery does not permit such indicia to identify the object with certainty. For example, if a hexahedral shape is found to have has a barcode indicia on the smallest of three differently-sized faces, then candidate products that do not have their barcodes on their smallest face can be ruled out – effectively pruning the universe of candidate products, and increasing the confidence scores for products that have barcodes on their smallest faces.

Similarly, the aspect ratio (length-to-height ratio) of barcodes varies among products. This information, too, can be sensed from imagery and used in pruning the universe of candidate matches, and adjusting confidence scores accordingly.

(As suggested by the foregoing, the processing system may maintain multiple identification hypotheses about each item in the pile. For example, the system may separately compute confidence scores that the cylindrical shape in Fig. 31 is a particular can of soup, or a particular can of potato chips. Some evidence may increase or decrease both scores in tandem (e.g., thermal camera data indicating the cylinder is cold, or at room temperature). But other evidence will tend to increase confidence in one hypothesis, and reduce confidence in another.)

As another example of how the system's assessments about the different segmented shapes can be refined by reference to other sensor data, consider weight data. Where the weight of the pile can be determined (e.g., by a conveyor or cart weigh scale), this weight can be analyzed and modeled in terms of component weights from individual objects – using reference weight data for such objects retrieved from a database. When the weight of the identified objects is subtracted from the weight of the pile, the weight of the unidentified object(s) in the pile is what remains. This data can again be used in the evidence-based determination of which objects are in the pile. (For example, if one pound of weight in the pile is unaccounted for, items weighing more than one pound can be excluded from further consideration.)

It will be recognized that the above-described technology can be conceived, in one respect, as growing a model of known objects – adding objects as they are identified. An alternate conception is to model an unknown pile, and then subtract known objects from the model as the objects are identified.

An initial model of a total 3D volume presented for checkout can be generated based on sensed data (e.g., imagery). When an object in the pile is identified (e.g., by product markings, such as by fingerprinting, barcode, text OCR, or through use of other evidence), the object's shape (volume) is obtained from reference data stored in a database. The object's orientation (pose) is next determined – if not already known). Again, this may be done by comparing sensor data (e.g., showing edges, product markings, etc.) with reference information stored in a database. Once the object orientation is known, that object's shape – correspondingly oriented –is virtually subtracted from the 3D volumetric model. (Its weight may also be subtracted from the unknown pile weight, if weight information is known.) This process proceeds for all identifiable objects. The remaining volume is then checked for hidden objects, or an output signal can be issued, alerting that the pile needs to be spread out to reveal hidden contents.

For any method based on extracting geometrical edges from luminance images, there is a need to distinguish geometrical edges from pattern edges. One approach is to use range images/depth maps (in addition to, or in lieu of, intensity images) to avoid confusion arising from printing and other markings on the faces of objects.

While the above-detailed geometrical edge-based, rule-based procedure for segmenting 3D data into component volumes is a simple way of identifying conventional shapes, other items encountered in supermarkets can have less conventional shapes – such as egg cartons. These shapes can be defined by stored reference data (templates, akin to CAD-like models) to which the image processing system can resort for identification purposes, e.g., using known bin-picking object identification arrangements. In one such arrangement, the 3D imagery is searched for the various templates in a store's catalog, to determine whether any such item is at least partially visible in the pile. Such procedure can be applied before, or after, the rule-based segmentation of conventional shapes.

Further Remarks Concerning Conveyors

Reference was made, above, to various innovations associated with conveyors at retail checkouts. Most of these may be regarded as falling into one of three classes: (1) aids in object recognition, to increase through-put and accuracy; (2) new features for the shopper; and (3) benefits for advertisers.

In the first class, markings on the conveyor can serve to identify the plane on which the objects rest – a helpful constraint in product recognition and object segmentation. The markings can also serve to identify the velocity of the conveyor, and any variations. Relatedly, the markings can serve as spatial references that help with pose estimation. In some embodiments, the markings serve as focus or calibration targets for one or more of the imaging systems. Such spatial reference information is also helpful to establish correspondence between information derived by different identification technologies (e.g., watermark and barcode).

Among new features for the shopper, such conveyor markings can define a lane (Fig. 8) on which the shopper can place coupons. The system is alert to this lane, and examines any imagery found there as candidate coupon imagery. When detected, the system responds according to known prior art coupon-processing methods.

The user may place their smartphone in this lane, with the display facing up. A coupon-redemption app on the smartphone may cyclically present different screens corresponding to different coupons collected by the user (e.g., by scanning promotions in the store, or in a newspaper, or sent to the smartphone electronically – such as by Groupon, etc.). As each coupon is successfully read by the checkout system (e.g., sensed by a camera, or the coupon information otherwise-conveyed), the checkout system signals such success to the smartphone. This signal can comprise a beep of a particular tone, or other audible acknowledgement. Alternatively, another type of signal can be used (e.g., optical, radio, etc.). When the smartphone receives this signal, it then presents a next coupon to the checkout system (e.g., on its display). This process continues until all coupons available on the smartphone that are relevant to the merchandise being checked-out have been presented and acknowledged.

The check-out system camera can discern that the phone is on the conveyor belt – and not simply held over it – because its velocity matches that of the belt. The smartphone may automatically start the presentation of coupons (e.g., it may activate the coupon redemption app) in response to input from its sensors, e.g., sensing motion along a horizontal plane using its accelerometers, or sensing certain strobed illumination characteristic of a checkout lane using its front-facing camera, etc.

Conversely, the user's smartphone on the moving belt can collect visual information projected onto the conveyor by the projector. This information can represent discount coupons, redeemable at a subsequent visit for merchandise related to that being purchased by the consumer. (Such information can likewise be conveyed to the smartphone by audio, radio, or other communication technology.)

The conveyor can serve as a projection screen, onto which imagery is projected by, e.g., an overhead projector. (Typically, the projector is obliquely angled towards the conveyor, with corrective optics to redress, e.g., keystoning.) As objects on the conveyor are recognized, the projector can present related information, such as item name and price, other suggested purchases, related recipes, digital coupons, etc. The projected imagery desirably follows the associated items as they travel along the conveyor.

The user can touch any of the indicia projected onto the conveyor. A camera senses the user's action (e.g., a camera adjacent the conveyor that captures imagery for item recognition, or a camera positioned with the projector). The system understands the camera-sensed action to indicate user interest in the touched indicia. Several responses may be triggered.

One simply is to freeze the projected indicia in place relative to the user (while the belt and items advance). This allows, e.g., the user to capture an image of the indicia with a personal device, e.g., a smartphone. (This allows the user later to explore the presented information, e.g., pursuing web links indicated by digital watermarks encoded in the projected indicia.)

Another system response is to present a video to the user. The video can be projected at a stationary location, such as on the conveyor (which may continue to advance under the projected video) or on a display screen (e.g., a screen on which the user's purchases are tallied).

Another response is to credit a coupon discount to the amount owed by the consumer. By presenting cash-back coupons to the consumer as items are being checked-out, the consumer can be incented to watch the conveyor (or other device where information is presented). Much of the projected information may be promotional in nature, and the viewer's attention can be maintained by periodically presenting a coupon.

The projected indicia be text, a logo, machine-readable data (e.g., barcode or watermark), etc. It may comprise a video.

For advertisers, the conveyor belt can be printed with brand messages, or carry temporary stickers for different branding events. In some instances the belt is dynamically printed each cycle, and wiped clean during its under-counter return. Known "white board" and "dry erase" markings can be used.

Further Improvements

The sensor evidence considered in identifying items being purchased needn't be collected at the checkout station. Consider, for example, an implementation in which the shopper's track through the store is monitored, such as by an indoor location technology (e.g., using a unit carried by the shopper or the shopper's cart to sense or emit signals from which location is determined, e.g., sensing a different flicker or modulation of LED lighting in different aisles, or other form of location-related signaling), or by ceiling-, floor- or shelf-mounted cameras or other sensors, etc. If the shopper stops for 15 seconds in front of the Campbell's soup shelf, this data helps reinforce a hypothesis that the cylindrical shape revealed in Fig. 31 is a can of soup – even if no barcode or other identifying information can be discerned from imagery captured at checkout.

Sometimes confidence scores can be revised based on the lack of certain evidence. For example, if the shopper's path through the store did not go down the aisle containing the Pringles potato chips, this tends to increase a confidence score that the cylindrical object is a soup can. (As is evident, certain embodiments of this technology rely on a database or other data store with information about the layout of the store, indicating locations of the different products in the store's inventory.)

Thus, knowing locations in the store visited by the shopper, and more particularly – knowing where the shopper or the shopper's cart paused in the store, is useful information is deducing the identity of items in the cart. Still better is knowing those locations in the store where an item was placed into the cart. (The introduction of an item into the cart can be sensed in various ways, including a cart weight sensor, a camera, an array of break-beam photo sensors that senses a hand or other item passing through a plane into the volume of the cart, photosensors that detects shadowing by a new item (or by the user's hand/arm, etc.) as it is moved into the cart, etc.)

A related class of evidence comes from inventory sensors. Cameras, weight transducers, near field chip readers, or other sensors can be positioned to monitor the removal of stock from shelves. If a ceiling mounted camera, imaging the soup shelves, captures video or periodic imagery revealing that a can of Campbell's Condensed Chicken Noodle Soup leaves the shelf at around 10:30 a.m., this tends to increase the confidence score that a cylindrical shape sensed at a checkout station at 10:40 a.m. is a can of Campbell's Condensed Chicken Noodle Soup. (This datum would increase the confidence score less for a cylindrical shape sensed at a checkout station at 11:10 a.m., and perhaps not at all for a cylindrical shape sensed at a checkout station at 2:00 p.m. That is, the analytic weight given to the data varies in accordance with a time-related factor.)

Data from such an inventory sensor, indicating removal of a can of chicken soup at 10:30 a.m., in conjunction with data from a location sensor – indicating presence of the shopper at the soup shelves at 10:30, is even stronger evidence that the cylindrical shape in the shopper's pile is a can of chicken soup.

In some instances, inventory-tracking cameras are positioned or otherwise designed to avoid capturing imagery or other information about shoppers in the aisle, to avoid certain privacy concerns. Imagery from such cameras may be presented on public displays in the aisles or elsewhere in the store, to put shoppers at ease.

The foregoing has just touched on a few of the multiple sensors that can provide product-identifying evidence. A more lengthy, but still incomplete, list of technologies that can aid in product identification (and in discriminating between candidate products) includes: forced air (e.g., sensing disruption of air blown through a pile, as indicative of its contents – including change in its temperature, which can indicate a concealed frozen item), vibration (e.g., sensing resulting product movement and/or inertia, which can be indicative of density, and sensing sound, which can also be distinctive), other acoustic sensing (e.g., passing item surface past a pointed stylus, or vice versa, and analyzing the sound produced), ultrasonic excitation and imaging, radiographic screening (e.g., ultrasonic or millimeter wave scanning, such as is done by TSA equipment at airport security stations), light-polarization sensing (e.g., to reduce certain reflections and to help assess surface texture), other optical texture sensing, motion sensing (e.g., accelerometers), UV/IR cameras, watermarks, RFID/NFC chip sensing, weight sensing, shopper demographic sensing (e.g., by camera, or by reference to loyalty card profile), thermal time constants (e.g., how quickly a warm area caused by manual handling decays in temperature, haptic sensing (e.g., rubber membrane that deforms as items are placed onto it), time of flight cameras, chemical and olfactory sensing, gaze tracking (e.g., sensing that shopper is looking at Campbell's condensed chicken noodle soup; tracking of a checkout clerk's gaze can be used to identify salient points in captured imagery – such as the locations of product barcodes; Google Glass goggles can be used in gaze tracking), sensing pose of hand as shopper or clerk grasps an item, inertial modeling (heavy items are moved along a different track than light things), shopper's purchasing history (shopper prefers Coke to Pepsi, buys milk weekly, bought a 24-pack of paper towels last week so is unlikely to buy paper towels for a while), statistical item correlations (when a shopper buys spaghetti noodles, the shopper often buys spaghetti sauce too), crowdsourced human identification by Amazon Turk service or the like (e.g., relaying imagery of an otherwise unidentified product to one or more human evaluators for assessment), etc., etc.

The technologies detailed herein can utilize data collected from sensors at a variety of locations, including from the product itself (e.g., packaging includes certain wirelessly-coupled sensors), from store shelves, from ceilings (looking down onto aisles or shelves), in shopping carts, carried or worn by shoppers, at point of sale stations, associated with checkout conveyors, carried/worn by clerks or shoppers, in bagging areas, etc.

Such collected information is used in a data fusion manner, to successively narrow a universe of possible product identifications. Probabilistic modeling can often be employed (e.g., using Bayesian classifier, boosted tree, or random forest approaches).

Thus an exemplary supermarket system uses a multi-feature product identification procedure – the components of which contribute different evidence to a decision module that tests different product identification Bayesian hypotheses until one emerges as the winner.

One component of the supermarket's system may provide volumetric product configuration (shape) information. Another component may provide color histogram data generated from RGB imagery depicting the products. Another may provide barcode data (which may be incomplete or ambiguous). Another may contribute digital watermark data. Another may provide NFC/RFID information. Another may provide image fingerprint data. Another may contribute recognized text (OCR) data. Another may contribute weight information (e.g., from a conveyor weigh scale). Another may contribute item temperature information (e.g., discerned from infrared camera imagery or air temperature). Another may provide information about relative placement of different items (a consumer is more likely to put a 12-pack of soda on top of a bag of dog food than on top of a bag of potato chips). Others may contribute information gathered in the shopping aisles. Etc. Not all such information may be present for all items, depending on item characteristics, the manner in which the items are arrayed on a conveyor, availability of sensors, etc.

Outputs from plural such components are provided to a decision module that determines which product identification is most probably correct, giving the ensemble of input information.

By such an arrangement, collected evidence is used to refine the confidence scores of the different objects seen, or deduced to be, presented for checkout, until all are identified within a given certainty (e.g., in excess of 99.9%). After all evidence is considered, any object(s) not identified with such accuracy is indicated for manual examination by a clerk, or is mechanically diverted from the pile for further evidence collection (e.g., by imaging, weighing, etc.)

In some embodiments, a projector can project information onto the pile of items to convey information. For example, the projector can project price information onto (or near) items as they are identified, to assure the customer that the price charged is as expected. Additionally, or alternatively, the projector can illuminate products in green (or some other distinctive fashion) after they have been successfully identified. Red can indicate products (or areas in the pile) about which the system is uncertain. A checkout clerk can thus examine the pile and remove anything illuminated in red for additional imaging (or other sensing), or simply scatter the pile to expose additional product faces for imaging, until the system has recognized all the items and the pile is uniformly illuminated in green.

Some arrangements have no checkout counter; items are moved (e.g., by the shopper) directly from a shopping cart (basket) to a bag. A system according to the present technology can monitor the space between the cart and the bag, and can sense one or more types of data from objects as they pass, to effect identification (sometimes in conjunction with previously-acquired information).

Shopping bags, and/or the bagging area, may also be enhanced to aid identification. For example, bags may be provided with features to aid in item recognition/identification – such as markers to assist in determining object pose.

Moreover, bags or the bagging area may also be equipped with sensors to aid identification. For example, a bag may be suspended from hooks allowing the weight of the bag to be sensed. A bag may also be positioned (e.g., hung or sat) in an instrumented area, with one or more sensors for collecting object identification data. The bags may be made of a material that is functionally transparent to the sensing technology (e.g., millimeter wave scanning, or UV/IR illumination), so that data can be sensed from the bag's contents from one or more external sensors. Alternatively, sensors may be placed inside the bag. In one particular arrangement, sensors are removably placed inside the bag. For example, a frame structure, comprising four vertically-oriented planar members coupled at their vertical edges, and defining a regular hexahedral volume – just smaller than that of the bag itself, is lowered into an empty bag (e.g., a fabric bag brought by the shopper). One or more panels of this frame is instrumented with one or more sensors. Items are then placed into the bag, by placing them within the frame structure. The sensor(s) acquires data from the items as they are placed – or as they rest – within the structure. After data has been collected by the sensors, the frame instrumented structure is lifted and removed from the bag – ready for re-use in another bag. With the declining cost of sensors, a bag brought by the shopper may itself be permanently equipped with sensors, which are polled at the bagging station for sensed data by the store computer system.

The order in which a human places items in a bag can also be used as evidence of item-identification. For example, the system may identify (e.g., by barcoding) a package of hamburger buns that is placed into the bottom of a bag. If a large shape is next placed into the same bag, the system can deduce that this next object is not a heavy object – such as a six-pack of soft drinks. More likely is that the large object is a light weight item – such as a pack of paper towels.

If a shopper's items are identified before being bagged, the system can suggest to the shopper – or a clerk – a rational bag-packing strategy. A procedure based on stored rule data can be followed. For example, the system can first determine the aggregate weight and volume of the shopper's items, and apply the stored rules to determine a number of bags required to hold such a weight/volume of items. Similarly, given N bags (e.g., three), the rules can indicate which items should be placed in the bottom of each bag (e.g., the heaviest or most crush-resistant/crush-tolerant items). Likewise, the rules can determine which items should be placed in the top of each bag (light items and the most crush-sensitive items). As a consequence of these determinations, the system can indicate which items should be placed in the middle of each bag. Other rules may lead to frozen and refrigerated items being placed together, and remote from items that may be frost damaged (and remote from deli items that may be warm). Etc. The suggestions may take the form of voiced instructions. Alternatively, projected light of different colors can illuminate different items, signaling that they should next be placed in bags that are similarly identified by color. In essence, such arrangement is a bagging expert system.)

A weight sensor in a cart may be used not just to weigh an item as it is placed into the cart (i.e., by sensing the before-after difference in weight); it can likewise be used to weigh an item as it is removed from the art (again by reference to the weight difference).

Some implementations of the technology are self-learning. For example, the detailed system can statistically track data that – in the aggregate, begins to reveals clues for product identification. A data driven model for product identification thus evolves through exposure to additional data. The system may discern, for example, that a shopper who passes through the frozen foods aisle at the beginning of a fifteen minute shopping visit, is less likely to have a frozen food item presented for checkout than a shopper who passes through the frozen foods aisle at the end of such a shopping visit. Such probabilistic models can be constructed by humans, but are more readily – and accurately – developed by analysis of historical shopping data.

Information collected by distributed sensors (e.g., in carts, shelves, and/or ceilings, etc.) can be used, in conjunction with shopping list data received from consumers, to aid in traffic management through the store. If the system finds a "milk" entry is found on the lists of five shoppers, it can suggest routes through the store for the different shoppers that allow them to pick up other items on their respective lists, and arrive at the milk cooler in time-staggered fashion – avoiding a bottleneck as one shopper carefully studies carton expiration dates while others wait.

The artisan will recognize that shoppers can be identified in various known ways, including loyalty cards, routine radio emissions from smartphones, smartphone apps that exchange data with a store computer, facial recognition and other camera-based techniques, etc.

Existing checkout systems commonly issue an audible signal (e.g., a beep) to confirm successful reading of a barcode. In accordance with another aspect of the present technology, the system issues different audible signals – depending on the manner of product identification. If a product is identified by barcode reading, one type of beep is issued (e.g., 250 milliseconds of 523 Hz signal). If the product is identified by digital watermark decoding, a second type of beep is issued (e.g., 400 milliseconds of 660 Hz signal). If the product is identified by fingerprint recognition, a third type of beep is issued (e.g., 500 milliseconds of 784 Hz signal).

Of course, these signals are exemplary only; any different signals can be used (including signals that are sequences of beeps – either all of the same frequency, or of different frequencies).

If item recognition is based on several different types of object data, still other signals can be used. Alternatively, a signal indicating the identification technology that served as a primary basis for identification can be issued.

Watermarks will gain deployment gradually in supermarkets. As with barcodes, some time will pass before all items are watermark-encoded. The different audible feedback signals noted above will help train the checkout staff about which types of product identification are typically successful with which types of products. For example, if a cashier learns, by repeated exposure, that boxes of Kleenex tissues always issue a barcode "beep" and not a watermark "beep," then the cashier will learn to slow down with such items, and be sure that the barcode on Kleenex boxes is oriented towards the sensing device. On the other hand, if the cashier learns that General Mills cereal boxes are reliably read by watermark recognition, then these items may be passed more quickly through checkout, since the cashier has confidence that they will be read regardless of orientation.

While certain embodiments discerned the geometrical pose of component patches on the items being checked-out, and then processed the imagery depicting such patches so as to yield processed imagery showing the patches as if presented squarely to the camera, in other embodiments, this latter action is not necessary. Instead, the discerned pose information can be provided to the system module that derives product identification information. Such module can then work with the original imagery, expecting its geometrically distorted state, and discerning the identification information taking such distortion into account.

In some of the detailed embodiments, the geometrical pose information for component surfaces on products/packaging is discerned from the camera imagery. In other implementations, the pose information can be determined otherwise. One such alternative is to use the Microsoft Kinect sensor device to sense the 3D environment. Tools extending the use of such device far beyond its original gaming application are now widely available. Microsoft, for example, distributes a software development kit ("Kinect for Windows SDK") that enables programmers to use the sensor's various capabilities in arbitrary applications. Open source drivers for the Kinect sensor are available from Adafruit Industries and PrimeSense, Ltd. In a further aspect of the present technology, such a sensor is used in assessing the pose of product surfaces at a supermarket checkout.

Unlike some other pose-assessment arrangements, the Kinect sensor does not rely on feature extraction or feature tracking. Instead, it employs a structured light scanner (a form of range camera) that works by sensing the apparent distortion of a known pattern projected into an unknown 3D environment by an infrared laser projector, and imaged by a monochrome CCD sensor. From the apparent distortion, the distance to each point in the sensor's field of view is discerned.

Microsoft researchers have demonstrated use of a movable Kinect sensor to generate a volumetric model of an unknown space (Azadi et al, KinectFusion: Real-Time Dynamic 3D Surface Reconstruction and Interaction, Article 23, SIGGRAPH 2011). The model relies on continually-tracking 6DOF information about the sensor (e.g., defining its X-, Y-, and Z- position, and its pitch/roll/yaw orientation, by auxiliary sensors), and uses this information – with the depth data output from the moving range sensor system – to generate a 3D model of the space. As the sensor is moved, different views of the scene and objects are revealed, and these are incorporated into the evolving 3D model.

In Kinect-related embodiments of the present technology, the sensor typically is not moved. Its 6DOF information is fixed. Instead, the items on the checkout conveyor move. Their motion is typically in a single dimension (along the axis of the conveyor), simplifying the volumetric modeling. As different surfaces become visible to the sensor (as the conveyor moves), the model is updated to incorporate the newly-visible surfaces. The speed of the conveyor can be determined by a physical sensor, and corresponding data can be provided to the modeling system.

In addition to providing pose information for component item surfaces, such arrangement provides an additional manner of product identification – by volumetric product configuration. As noted, some existing products have distinctive shapes, and packaging for others readily could be tailored to impart a distinctive product configuration. Even features as small as 1mm in size can be discerned by such volumetric modeling, allowing logos and other distinctive markings to be presented on products/packaging in raised embossing, or depressed engraving, fashion. Volumetric data from an item can be used, at checkout, for product identification – matching against a catalog of reference volumetric product configuration data (in a manner akin to present use of image fingerprinting for product identification).

In an implementation that uses the Kinect sensor for pose determination and/or volumetric configuration sensing, the Kinect RGB camera can be used as the sensor for capturing imagery from which other product identification information is determined. In such embodiments a checkout conveyor can be marked with volumetrically-sensible features, such as raised grooves or other prominences, embossed logos, etc. Such features can be used in a manner akin to the conveyor markings described earlier.

Volumetric modeling can also be performed without a Kinect-like sensor. With two or more different views of an item, or of items on a checkout conveyor, a 3D model of the depicted item(s) can be produced.

In many implementations, volumetric modeling is not used independently for product identification. Instead, it is one aspect of the above-noted multi-feature identification procedure – the components of which contribute different evidence to a decision module that tests different product identification Bayesian hypotheses until one emerges as the winner.

As described above, outputs from plural such components are provided to a decision module that determines which product identification is most probably correct, giving the ensemble of input information. This module can rely on reference information about products in the store's inventory, stored in a database or other data structure. It can likewise rely on analysis rules, stored in similar fashion. These rules may cause the module to accord the different input information with different evidentiary weight, depending on circumstances and candidate item identifications.

For example, if a weight sensor indicates an item weighs 12 ounces, the rules can specify that this is highly probative that the item is not a 40 pound bag of dog food. However, the rules may indicate that such information is of little value in determining whether the item is a can of corn or beans (for which the stored rules may indicate color histogram data has a greater discriminative value). Similarly, if a cylindrical carton is sensed to have a temperature below freezing, this is strong collaborating evidence that the item may be a container of ice cream, and is negating evidence that the item is a container of oats.

In one illustrative implementation, the decision module performs a staged analysis. Tests that are fastest, and/or simplest, are performed early, and are used to rule-out large numbers of possible items from the store's catalog of inventory. For example, if the weigh scale indicates a weight of one pound, all items having weights above three pounds may be disqualified immediately (e.g., six- and twelve-packs of soda, large containers of liquid detergent, 40 pound bags of dog food, etc.). Tests that are highly discriminative, e.g., having the potential to identify a single item out of the store's catalog (analysis of captured data for digital watermark and barcode information is of this sort), may also be applied early in the staged process.

Generally speaking, a minority of the products in a supermarket comprise most of the sales volume. Coke is seen frequently on checkout counters; not so with smoked oysters and obscure ethnic condiments. Desirably, the checkout system is optimized for recognition of the products that constitute most of the volume. Thus, for example, the analysis rules in the embodiment of Fig. 6 may be selected, and ordered, to most quickly identify the most popular grocery items.

Such a system may be self-learning. A new product may be recognized, initially, by an express identifier, such as a watermark or a barcode. Through repeated exposure, the system collects information about image fingerprints, weights, color histograms, temperature, etc., that it associates with such product. Later, the system becomes able to recognize the item even without reference to the original identifier.

In some staged recognition systems, data from one stage of the analysis is used in determining an order of a later part of the analysis. For example, information captured in the first stage of analysis (e.g., color histogram data) may indicate that the item is probably a carton of Diet Coke product, but may leave uncertain whether it is a 6-pack or a 12-pack. This interim result can cause the analysis next to consider the item weight. If the item weighs between 9 and 10 pounds, it can be identified as highly likely to be a 12-pack carton of Diet Coke. If the item weighs half that amount, it can be identified as highly likely to be a 6-pack. (If it weighs less than 4.5 pounds, the initial identification hypothesis is strongly refuted.)

In contrast, if the initial histogram indicates the product is likely a carton of Reese's product, but leaves uncertain whether the carton contains ice cream bars or peanut butter cups, a temperature check may next be considered to most quickly reach a reliable item identification.

The rules data consulted by the decision modulation assign weighting values to different evidentiary parameters and different items. These values are used to determine an evolving probabilistic certainty that a tentative product identification is correct. When the decision module has considered enough evidence to make a product identification with a probabilistic certainty exceeding a threshold value (e.g., 99.99%), further analysis is skipped, the module outputs the product identification, and it can then consider a next item in the checkout. If all of the available evidence is considered, and the threshold certainty value is not met, this circumstance can be flagged to a human operator (e.g., providing an image of the item and/or other associated item information) for follow-up.

In a related implementation, a voting arrangement is used, with different identification technologies each casting virtual votes for different item identifications. The votes of some identification technologies may be more heavily weighted than others, reflecting their greater granularity of identification, or reliability of identification. The item identification with the most votes wins.

In some embodiments, an item that is not reliably identified – after consideration of all the available evidence, is physically diverted so that the flow of subsequent items through the checkout procedure is not stopped while the troublesome item is manually examined. Such diversion can be by an arrangement such as compressed air, a diverting arm, or a trap door.

It will be recognized that smartphone apps (and the successors to smartphones and their apps) can be adapted to cooperate with and supplement (e.g., in terms of sensor data collection and data processing) the detailed systems. For example, a shopper may maintain a shopping list on the smartphone, which list data is shared with the store computer (perhaps in advance of the shopper's visit) to aid in the shopping experience. (An entry of an item on a shopper's electronic list is still additional evidence that can be used in identifying items presented for checkout. Indeed, the list can comprise a suitable set of initial identification hypotheses about items in that shopper's checkout pile.)

Relatedly, data can be captured at home and used in connection with shopping. For example, Tupperware and other re-usable food containers can be equipped with sensors, e.g., providing data about the weight, chemical/smell, and appearance of their contents. A camera/illuminator in a lid of such a container can apply object recognition techniques to visually distinguish different products (e.g., popcorn, sugar, nuts, flour, etc.). Existing containers may be retro-fit with sensor-equipped lids. Such devices can be self-powered (e.g., by battery), or energized based on parasitic excitation from another source. Such devices wirelessly communicate with other such devices, or with a computer, via a mesh or other network. A cookie container may have its own social networking presence (e.g., a Facebook or Twitter account) – informing humans or other data consumers about its fill level, when last refreshed, when last opened (and by whom), etc. When the inventory of such a monitored food product falls below a threshold (which may be determined by the historical inventory level at which the container has been re-filled in the past), that food item can be added to the user's shopping list.

Similarly, in a social network vein, when a consumer adds a food item to a shopping list, or when such item is added to the consumer's shopping cart, this information may be published by social network channels (e.g., Facebook or Twitter). This information may be made available (with the consumer's permission) to companies that want to market to the consumer. For example, if Tony puts a can of Campbell's soup on his list or in his cart, this information – or the opportunity to respond to it – may be offered to Campbell's and its competitors (e.g., General Mills' Progresso soups). For example, in an automated auction, these different companies may bid increasing amounts of cash (or other consideration) to determine which – if any – gets to interact with Tony, or gets access to certain of Tony's demographic profile data for marketing or research purposes. (The consideration may be split between Tony and the store.) The interaction may come via a display screen in the cart or at the checkout station, via a portable device carried by Tony, via imagery projected on the conveyor at checkout, etc. Such object-related encounters can also be added to a stored repository of Tony's grocery profile data – serving as context information useful, e.g., in tailoring the search results (or order of search results) presented when Tony thereafter uses the Google search service or engages in other activities. If Tony does a Google search for a recipe (e.g., to make use of a surplus of tomatoes harvested from his garden), he might get different search results than Alice, who enters the same search terms – but whose grocery profile data is different.

These concepts needn't be applied only when Tony places an item on a list or in a cart. The same concepts can likewise be applied when Tony looks at a product in a supermarket. Eye tracking systems – coupled with a store's layout data – allow a shopper's gaze to be accurately discerned, e.g., to identify that Tony is looking at a shelf location where Campbell's Cream of Mushroom soups are stocked. The dwell time of the gaze can be noted as well. This information can be logged, published, and/or made available to others, as detailed above, and corresponding actions can be taken.

Some stores may choose to implement a Trusted Shopper checkout option – available to shoppers who meet certain qualification standards. These standards can include, e.g., purchases averaging more than $300/month, a loyalty-card shopping history with the store that dates back at least two years, an address within two miles of the store, etc. Other indicia of trustworthiness can be gathered from public and private databases, e.g., including credit scores, employment history, background checks, etc. The Trusted Shopper option is designed to enable such shoppers to more quickly check out, due to a heightened level of trust. For example, in a self-service checkout station, some of the alarms that occasionally bedevil regular shoppers ("Place item in the bagging area!") can be disabled for Trusted Shoppers. Similarly, instead of requiring goods to be machine-identified, the shopper can self-identify the items (e.g., by tapping a displayed entry from a list of items commonly purchased by that shopper, or by submitting a shopping list to indicate items being purchased). Qualified shoppers can be authenticated by facial recognition, card swipe and PIN number (e.g., loyalty card or credit/debit card), etc.

Feature Recognition

Certain implementations of the detailed technology employ recognition of robust feature descriptors (e.g., SIFT, SURF, and ORB) to aid in object identification.

Generally speaking, such techniques rely on locations within imagery where there is a significant local variation with respect to one or more chosen image features – making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in patent 6,711,293.

SIFT works by identification and description – and subsequent detection – of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by – for each candidate keypoint - interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled – with each bin encompassing ten degrees of orientation. Each pixel in the neighborhood contributes to the histogram, with the contribution weighted by its gradient's magnitude and by a Gaussian with $\sigma$ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints are different scales are identified – each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4 x 4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ 1.5 times the scale of the keypoint. Histograms contain 8 bins each, and each descriptor contains a 4x4 array of 16 histograms around the keypoint. This leads to a SIFT feature vector with (4 x 4 x 8 = 128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close – e.g., 25% to the distance score for the next-best match.

To further improve performance, an image may be matched by clustering. This identifies features that belong to the same reference image – allowing unclustered results to be discarded as spurious. A Hough transform can be used – identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130688 concerns a cell phone-based implementation of SIFT, in which the local descriptor features are extracted by the cell phone processor, and transmitted to a remote database for matching against a reference library.

While SIFT is perhaps the most well known technique for generating robust local descriptors, there are others, which may be more or less suitable – depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, EPFL Computer Vision Laboratory Technical Report 2011 (to appear in IEEE Transactions on Pattern Analysis and Machine Intelligence); Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.3.1).

Other Remarks

Having described and illustrated the principles of our inventive work with reference to illustrative features and examples, it will be recognized that the technology is not so limited.

For example, sensing and other processes described as taking place at a checkout station may additionally, or alternatively, be conducted elsewhere, such as in a shopper's cart, in a store aisle, etc.

Naturally, data from the sensors can be relayed to a processor by a variety of means – including both wired (e.g., Ethernet) and wireless (e.g., WiFi, Bluetooth, Zigbee, etc.).

Technologies described with reference to fixed systems (e.g., a POS terminal) can instead be implemented through use of portable devices (e.g., smartphones and headworn devices).

For expository convenience, parts of this specification posit that a retail store (e.g., a supermarket) has two essential portions: the checkout portion, and a shopping portion. The former comprises the checkout station (which can include any or all of a POS terminal, conveyor, cash drawer, bagging station, etc.), and the adjoining areas where the shopper and clerk (if any) stand during checkout. The latter comprises the rest of the store, e.g., the shelves where inventory is stocked, the aisles that shoppers traverse in selecting objects for purchase, etc.

As noted, while many of the detailed arrangements are described with reference to conveyor-based implementations, embodiments of the present technology can also be used to inspect, identify and inventory items presented by hand, or carried on the bottom of a shopping cart, etc. Indeed, item inventory and payment needn't be performed at a conventional checkout counter. Instead, items may be identified in the cart (or while being placed in the cart), and payment can be effected at any location – using the consumer's smartphone.

Although the specification discusses various technologies in connection with decoding watermark data from product packaging in retail settings, it will be recognized that such techniques are useful for the other identification technologies and other applications as well.

Off-the-shelf photogrammetry software can be used to perform many of the operations detailed herein. These include PhotoModeler by Eos Systems, Inc., and ImageModeler by AutoDesk.

Similarly, certain implementations of the present technology make use of existing libraries of image processing functions (software). These include CMVision (from Carnegie Mellon University), ImageJ (a freely distributable package of Java routines developed by the National Institutes of Health; see, e.g., en<dot>Wikipedia<dot>org/wiki/ImageJ), and OpenCV (a package developed by Intel; see, e.g., en<dot>Wikipedia<dot>org/wiki/OpenCV, and the book Bradski, Learning OpenCV, O'Reilly, 2008). Well regarded commercial vision library packages include Vision Pro, by Cognex, and the Matrox Imaging Library. Edge detection, ellipse-finding, and image segmentation are a few of the many operations that such software packages perform.

Some embodiments advantageously employ compressed sensing techniques. As is familiar to artisans, compressed sensing allows representation and processing of imagery with greatly-reduced data sets. See, e.g., Candes et al, An Introduction to Compressive Sampling, IEEE Signal Processing Magazine, March, 2008, 10 pp. Similarly, known computational photography techniques are widely useful in processing imagery at retail checkouts.

Data captured by cameras and other sensors (and information derived from such sensor data), may be referred to the cloud for analysis, or processing may be distributed between local and cloud resources. In some arrangements, cloud processing is perform in lieu of local processing (or after certain local processing has been done). Sometimes, however, such data is passed to the cloud and processed both there and in the local device simultaneously. The cloud resource may be configured to undertake a more detailed analysis of the information than is practical with the time and resource constraints of a checkout system. More particularly, the cloud resource can be configured to learn from the sensor data, e.g., discerning correlations between certain barcodes, watermarks, histograms, image features, product weights, product temperatures, etc. This knowledge is occasionally downloaded to the local device, and used to optimize its operation. (Additionally, a cloud service provider such as Google or Amazon may glean other benefits from access to the sensor data, e.g., gaining insights into consumer shopping behavior, etc. (subject to appropriate privacy safeguards). For this privilege, they may be willing to pay the retailer – providing a new source of income.)

Although the specification does not dwell on the point, the artisan will understand that the detailed checkout system can be a component of a point-of-sale (POS) station, which typically includes a keyboard, a display, a cash drawer, a credit/debit card station, etc. The station, in turn, is networked with a main store computer system, which commonly includes a database system accessible by the POS stations. In turn, the main store computer system is typically networked across the internet, or otherwise, with a corporate data processing system.

Known supermarket checkout systems, such as those by Datalogic, NCR, Fujitsu, etc., can be adapted to incorporate some or all of the technology detailed herein.

Reference was made to image segmentation. Techniques in addition to those detailed above are familiar to the artisan, including thresholding, clustering methods, histogram-based methods, region-growing methods, edge detection, etc.

Technology for encoding/decoding watermarks is detailed, e.g., in Digimarc's patent publications 6,912,295, 6,721,440, 6,614,914, 6,590,996, 6,122,403, and 20100150434.

Laser scanners used in supermarket checkouts are specialized, expensive devices. In contrast, certain embodiments of the present technology use mass-produced, low-cost cameras – of the sort popular in HD video chat applications. (The Logitech HD Webcam C615 captures 1080p video, and retails for less than $100.)

Such cameras commonly include sensors that respond down into the infrared spectrum, but such response is typically blocked by IR-reflective films. Such sensors can be used without the IR-blocking film to sense IR as well as visible light. As detailed in the cited watermarking patents (e.g., 6,912,295 and 6,721,440), use of IR sensing allows watermark and barcode information to be encoded in regions that – to a human – appear uniformly colored.

Although reference was made to GPUs, this term is meant to include any device that includes plural hardware cores operable simultaneously. Intel, for example, uses the term "Many Integrated Core," or Intel MIC, to indicate such class of device. Most contemporary GPUs have instruction sets that are optimized for graphics processing. The Apple iPhone 4 device uses a PowerVR SGX 535 GPU (included in a system-on-a-chip configuration, with other devices).

While detailed in the context of a supermarket checkout implementation, it will be recognized that the present technologies can be used in other applications, including postal and courier package sorting, manufacturing lines, etc.

In some embodiments, a wireless PDA-like device is used in conjunction with one or more fixed cameras to gather imagery from a checkout station. Typically, the wireless device is operated by a store clerk, but alternatively a smartphone owned and operated by a shopper can be used in this role. Some newer smartphones (e.g., the HTC PD29100) include multiple cameras, which can be used advantageously in the detailed arrangements.

In addition to the cited HTC model, particularly contemplated smartphones include the Apple iPhone 4s, and smartphones following Google's Android specification (e.g., the Verizon Droid Eris phone, manufactured by HTC Corp., and the Motorola Droid 4 phone).

(Details of the iPhone, including its touch interface, are provided in Apple's published patent application 20080174570.)

The design of computer systems used in implementing the present technology is familiar to the artisan. In general terms, each includes one or more processors, one or more memories (e.g. RAM), storage (e.g., a disk or flash memory), a user interface (which may include, e.g., a keypad or keyboard, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits - including digital, analog and mixed analog/digital circuitry. Execution of the instructions can be distributed among processors and/or made parallel across processors within a device or across a network of devices. Processing of content signal data may also be distributed among different processor and memory devices. As noted, "cloud" computing resources can be used as well. References to "processors," "modules" or "components" should be understood to refer to functionality, rather than requiring a particular form of software and/or hardware implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Certain implementations of the present technology can be use different software modules for performing the different functions and acts.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems – a special purpose computer system in which the operating system software and the application software is indistinguishable to the user (e.g., as is commonly the case in basic cell phones). The functionality detailed in this specification can be implemented in operating system software, application software and/or as embedded system software.

As indicated, different of the functionality can be implemented on different devices. For example, certain of the image processing operations can be performed by a computer system at a checkout counter, and other of the image processing operations can be performed by computers in "the cloud."

(In like fashion, data can be stored anywhere: in a local device, in a networked, remote device, in the cloud, distributed between such devices, etc.)

From the present disclosure – including the noted sources, an artisan can implement embodiments of the present technology without undue experimentation.

While certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Plenoptic cameras are available, e.g., from Lytro, Inc., Pelican Imaging Corp., and Raytrix, GmbH. Some of their work is detailed in patent publications 20110122308, 20110080487, 20110069189, 20070252074, 20080266655, 20100026852, 20100265385, 20080131019 and WO/2010/121637. The big consumer camera manufacturers are also understood to have prototyped such products, as has Adobe Systems, Inc. Some of Adobe's work in this field is detailed in patents 7,620,309, 7,949,252, 7,962,033.

Artisans sometimes draw certain distinctions between plenoptic sensors, light field sensors, radiance cameras, and multi-aperture sensors. The present specification uses these terms interchangeably; each should be construed so as to encompass the others.

Technology for supermarket checkout stations, incorporating imagers, is shown in U.S. patent documents 20040199427, 20040223663, 20090206161, 20090090583, 20100001075, 4,654,872, 7,398,927 and 7,954,719. Additional technologies for supermarket checkout, and object identification, are detailed in the following patent publications owned by Datalogic, a leader in the field: 20070084918, 20060147087, 20060249581, 20070267584, 20070284447, 20090152348, 20100059589, 20100213259, 20100217678, 20100158310, 20100123005, 20100163628, and 20100013934.

The present disclosure details a variety of technologies. For purposes of clarity, they are described separately. However, it will be recognized that they can be used together. While each such combination is not literally detailed, it is applicant's intent that they be so-combined.

Similarly, while this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

The artisan will be familiar with other writings useful in various implementations of the present technology, e.g., concerning construction of 3D models using imagery captured from different viewpoints. Examples include the PhD thesis of Snavely, "Scene Reconstruction and Visualization from Internet Photo Collections," University of Washington, 2008, and his published patent application 20070110338. These writings teach, e.g., "structure through motion" methods, and how corresponding image features in different images can be identified and how the geometries of the two images can thereby be spatially related.

The Wikipedia article "Structure from Motion" provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Such methods are also known from work in simultaneous location and mapping, or SLAM. A treatise on SLAM is provided in Durrant-Whyte, et al, Simultaneous Localisation and Mapping (SLAM): Part I The Essential Algorithms, and Part II State of the Art, IEEE Robotics and Automation, Vol. 13, No. 2 (pp. 99-110) and No. 3 (pp. 108-117), 2006. One implementation of SLAM adapted to operate even on mobile device CPUs/GPSs is available from 13$^{th}$ Lab, AB.

OpenSource implementations of SLAM are widely available; many are collected at OpenSLAM<dot>org. Others include the CAS Robot Navigation Toolbox (at www<dot>cas<dot>kth<dot>se/toolbox/index<dot>html), Matlab simulators for EKF-SLAM, UKF-SLAM,and FastSLAM 1.0 and 2.0 at www<dot>acfr<dot>usyd<dot>edu<dot>au/ homepages/academic/tbailey/software/index<dot>html; Scene, at www<dot>doc<dot>ic <dot>ac<dot>uk/~ajd/Scene/index<dot>html; and a C language grid-based version of FastSLAM at www<dot>informatik<dot>uni-freiburg<dot>de/~haehnel/old/ download<dot>html. (The <dot> convention is used so that this text is not rendered in hyperlink form by browsers, etc.)

SLAM is well suited for use with uncalibrated environments, as it defines its own frame of reference. Embodiments of the technology that employ handheld scanning devices (e.g., tethered hand-scanners, or wireless smartphones) are thus particularly suited for use with SLAM methods.

Other arrangements for generating 3D information from plural images are detailed in patent publications 20040258309, 20050238200, 20100182406, 20100319100, 6,137,491, 6,278,460, 6,760,488 and 7,352,386. Related information is detailed in applicant's pending application 13/088,259, filed April 15, 2011.

For a review of perspective, the reader is referred to the Wikipedia article "3D Projection." Wikipedia articles concerning "Plenoptic Cameras" and Light Field" provide additional information on those technologies.

(Copies of the above-cited non-patent literature are attached as appendices to application 13/231,893.)

Concluding Remarks

This specification details a variety of embodiments. It should be understood that the methods, elements and concepts detailed in connection with one embodiment can be combined with the methods, elements and concepts detailed in connection with other embodiments. While some such arrangements have been particularly described, many have not – due to the large number of permutations and combinations. However, implementation of all such combinations is straightforward to the artisan from the provided teachings.

Although features and arrangements are described, in some cases, individually, the inventors intend that they will also be used together. Conversely, while certain methods and systems are detailed as including multiple features, the inventors conceive that – in other embodiments – the individual features thereof are usable independently.

The present specification should be read in the context of the cited references (with which the reader is presumed to be familiar). Those references disclose technologies and teachings that applicant intends be incorporated into the certain embodiments of the present technology, and into which the technologies and teachings detailed herein be incorporated.

For example, certain of the cited references teach that a single image sensor can be used, in conjunction with mirrors and other optics, to capture imagery of an object from two or more different views (as opposed to using two or more different cameras). Some such arrangements use wavelength-selective optics (e.g., dichroic mirrors) so that three different images can be projected onto common pixel elements of a single sensor, allowing separate processing of the three different images in different color channels. Other such arrangements use mirrors to project images from different viewpoints onto different rectangular sub-regions of a common sensor. Still further, other of the prior art teaches that a color (RGB) image sensor can be used to capture imagery of an object, yet object identification can proceed using just pixels of a single color (e.g., whichever color shows the highest variance in its histogram). The artisan will recognize that these and all the other arrangements taught in the cited art can utilize the methods and features detailed herein, and vice versa.

To provide a comprehensive disclosure, while complying with the statutory requirement of conciseness, applicants incorporate-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

We claim:

1. A method comprising:

receiving imagery representing two packaged items from a digital camera, each of the packaged items including digital watermarking encoded in packaging on the items;

using one or more programmed electronic processors, analyzing the imagery to detect the digital watermarking;

accessing a spatial template associated with the digital watermarking when two or more instances of digital watermarking are detected in a single image frame;

comparing spatial areas containing the two or more instances of digital watermarking within the imagery to the spatial template;

carrying out an action based on said comparing.

2. The method of claim 1 in which the action comprises determining that the imagery includes two packaged items.

3. The method claim 2 in which the action further includes charging a customer for the two packaged items.

4. The method of claim 2 in which the action further includes signaling that two items are presented for checkout.

5. The method of claim 1 in which the two or more instances of digital watermarking are detected in non-contiguous imagery areas, and said accessing a spatial template associated with the two or more instances of digital watermarking occurs when the two or more instance of digital watermarking are detected in the non-contiguous imagery areas within the single image frame.

6. The method of claim 1 in which the spatial template is sized according to the two packaged items.

7. The method of claim 6 in which the spatial template is placed around an image block area where an instance of the digital watermarking is detected.

8. The method of claim 7 in which said comparing spatial areas containing the two or more instances of digital watermarking within the imagery to the spatial template comprises determining that the digital watermarking falls within a predetermined tolerance associated with the spatial template.

9. The method of claim 1 in which the digital watermarking comprises a message component and an orientation component.

10. The method of claim 9 in which the message component is associated with the spatial component.

11. An apparatus comprising:

a 2D-camera for capturing imagery;

memory for storing captured imagery;

one or more programmed electronic processors configured for:

detecting digital watermarking from imagery captured by said 2D-camera, the imagery representing two packaged items, each of the two packaged items including digital watermarking encoded in packaging on the two packaged items, the digital watermarking comprising a message component;

using the message component, obtaining a spatial template when two or more instances of digital watermarking are detected within a single image frame of the captured imagery;

determining whether spatial areas within the captured imagery that are associated with the two or more instances of digital watermarking correspond in a predetermined manner to the spatial template, the determining yielding a result;

executing an action based on the result of the determining.

12. The apparatus of claim 11 in which the action comprises determining that the captured imagery includes two packaged items.

13. The apparatus claim 12 in which the action further includes charging a customer for the two packaged items.

14. The apparatus of claim 12 in which the action further includes generating a signal indicating that two items are presented for checkout.

15. The apparatus of claim 11 in which the two or more instances of the digital watermarking are detected in non-contiguous imagery areas, and the obtaining a spatial template when two or more instances of digital watermarking are detected within a single image frame of the captured imagery occurs when the two or more instance of digital watermarking are detected in the non-contiguous imagery areas within the single image frame.

16. The apparatus of claim 11 in which the spatial template is sized according to the two packaged items.

17. The apparatus of claim 16 in which the spatial template is placed around an image block area where an instance of digital watermarking is detected.

18. The apparatus of claim 17 in which the determining whether spatial areas within the captured imagery that are associated with the two or more instances of digital watermarking correspond in a predetermined manner to the spatial template comprises determining that the digital watermarking falls within a predetermined tolerance associated with the spatial template.

19. The apparatus of claim 11 in which the digital watermarking comprises an orientation component.

20. An apparatus comprising:

means for capturing imagery;

means for storing captured imagery;

means for detecting digital watermarking from imagery captured by said means for capturing imagery, the imagery representing two items, each of the two items including digital watermarking encoded thereon, the digital watermarking comprising a message component;

means for obtaining a spatial template, using the message component, when two or more instances of digital watermarking are detected within a single frame of the imagery;

means for evaluating whether spatial areas within the captured imagery that are associated with the two or more instances of digital watermarking correspond in a predetermined manner to the spatial template, said means for evaluating producing a result;

means for controlling an action based on the result.

* * * * *